United States Patent
Boland et al.

(10) Patent No.: US 11,136,459 B2
(45) Date of Patent: Oct. 5, 2021

(54) VISCOELASTIC CONDUCTIVE NANOMATERIAL-POLYMER NANOCOMPOSITES AND SENSING DEVICES COMPRISING THE COMPOSITE MATERIAL

(71) Applicant: The Provost, Fellows, Foundation Scholars, & The Other Members of Board, of The College of The Holy & Undiv. Trinity of Queen, Dublin (IE)

(72) Inventors: Conor Boland, Dublin (IE); Umar Khan, Sligo (IE); Jonathan Coleman, Dublin (IE)

(73) Assignee: The Provost, Fellows, Foundation Scholars, & the Other Members of Board, of the College of the Holy & Undiv. Trinity of Queen, Dublin (IE)

( * ) Notice: Subject to any disclaimer, the term of this patent is extended or adjusted under 35 U.S.C. 154(b) by 0 days.

(21) Appl. No.: 16/323,149

(22) PCT Filed: Aug. 3, 2017

(86) PCT No.: PCT/EP2017/069754
§ 371 (c)(1),
(2) Date: Feb. 4, 2019

(87) PCT Pub. No.: WO2018/024866
PCT Pub. Date: Feb. 8, 2018

(65) Prior Publication Data
US 2019/0185672 A1     Jun. 20, 2019

(30) Foreign Application Priority Data
Aug. 4, 2016  (EP) .................... 16182749

(51) Int. Cl.
*C08L 83/04*      (2006.01)
*C08K 3/04*       (2006.01)
*H01B 1/04*       (2006.01)
*B82Y 30/00*      (2011.01)
*B82Y 40/00*      (2011.01)
*C08L 101/00*     (2006.01)
*H01B 1/12*       (2006.01)

(52) U.S. Cl.
CPC .............. *C08L 83/04* (2013.01); *B82Y 30/00* (2013.01); *C08K 3/04* (2013.01); *H01B 1/04* (2013.01); *H01B 1/12* (2013.01); *B82Y 40/00* (2013.01); *C08K 2201/001* (2013.01); *C08K 2201/011* (2013.01); *C08L 101/00* (2013.01)

(58) Field of Classification Search
CPC ......... C08L 83/04; C08L 101/00; C08K 3/04; C08K 2201/001; C08K 2201/011; B82Y 30/00; B82Y 40/00; H01B 1/04; H01B 1/12
USPC ......... 252/500, 502, 510, 511; 977/742, 842
See application file for complete search history.

(56) References Cited

U.S. PATENT DOCUMENTS

| | | | |
|---|---|---|---|
| 4,054,714 A * | 10/1977 | Mastrangelo | ............ C09J 4/06 428/328 |
| 2014/0011969 A1 | 1/2014 | Panchapakesan | |
| 2014/0364523 A1 | 12/2014 | Bloomfield | |
| 2016/0033403 A1 | 2/2016 | Packirisamy et al. | |

FOREIGN PATENT DOCUMENTS

| | | | | |
|---|---|---|---|---|
| EP | 2138535 A1 | 12/2009 | | |
| WO | WO-2007053051 A1 * | 5/2007 | ............ B29C 33/64 |
| WO | WO-2015049067 A2 | 4/2015 | | |

OTHER PUBLICATIONS

Gupta "Viscoelastic nature of Au nanoparticle-PDMS nanocomposite gels." Bull. Mater. Sci., vol. 38, No. 4, pp. 817-823. (Year: 2015).*
Seshadri "Softening in silver-nanowire-filled polydimethylsiloxane nanocomposites." Appl. Phys. Lett. 105, 013110 (Year: 2014).*

* cited by examiner

*Primary Examiner* — Tri V Nguyen
(74) *Attorney, Agent, or Firm* — Cesari & McKenna, LLP

(57) ABSTRACT

A homogenous composite material with increased tensile strength comprising 2-dimensional nano-sheets exfoliated from a 3-dimensional layered material mixed in a liquid non-Newtonian viscoelastic material to produce the homogenous composite material; and a process for making the same.

25 Claims, 13 Drawing Sheets

C

D

E

VISCOELASTIC CONDUCTIVE NANOMATERIAL-POLYMER NANOCOMPOSITES AND SENSING DEVICES COMPRISING THE COMPOSITE MATERIAL

CROSS REFERENCE TO RELATED APPLICATIONS

This application is the National Stage of International Application No. PCT/EP2017/069754, filed on Aug. 3, 2017, which claims priority to European Application No. 16182749.8, filed on Aug. 4, 2016. The contents of each application are hereby incorporated by reference in their entirety.

FIELD OF THE INVENTION

The invention relates to conductive nanomaterial-polymer composites. In particular, the invention relates to a composite product of conductive 2-dimensional materials or conductive nanomaterials and their use in sensing devices.

BACKGROUND TO THE INVENTION

Interest in graphene has exploded over recent years because of its exceptional electronic, optical and mechanical properties. One important application-area is as a filler in polymer-based nanocomposites. Graphene has been added to thermoplastic, thermosetting and elastomeric polymers in order improve their electrical, mechanical, thermal and barrier properties. One application that utilises the inherent coupling of mechanical and electrical properties found in many nanocomposites is strain sensing. Nanocomposite strain sensors convert mechanical deformations of nano-conductor networks into resistance changes. Although such sensors are capable of monitoring quasi-static deformations, dynamic changes of stress or strain have not been studied in detail.

Generally, most non-polymeric materials show elastic behaviour, where the stress varies with strain but not significantly with time. Viscoelasticity, on the other hand, describes the response of a material to both stress and time. Although all polymers are viscoelastic to some extent, viscoelastic materials span a very broad range over many orders of magnitude of viscosity. The rheology of graphene-polymer composites has been investigated (Valles C, Young R J, Lomax D J, Kinloch I A. The rheological behaviour of concentrated dispersions of graphene oxide. J. Mater. Sci. 2014, 49(18): 6311-6320; Yin H, Dittrich B, Farooq M, Kerling S, Wartig K-A, Hofmann D, et al. Carbon-based nanofillers/poly(butylene terephthalate): Thermal, dielectric, electrical and rheological properties. J. Polym. Res. 2015, 22(7): 140). US 2014/011969 A1 discloses the preparation of a homogenous dispersion of multi-wall carbon nanotubes (MWNT) in polydimethyl siloxane (PDMS) and the use of a PDMS cross-linker to create covalent cross-linkers. US 2016/033403 A1 describes a method of fabricating a nanocomposite material comprising a partial and controlled reduction of metal salts to metal nanoparticles using a cross-linking or curing agent to create covalent crosslinks, and the addition of electrically conductive nanoparticles. EP 2138535 A1 describes a vulcanizable composition comprising a hydrogenated carboxylated nitrile rubber, a cross-linking agent that creates covalent crosslinks, and carbon nanotubes. US 2014/364523 A1 discloses a viscoelastic silicone rubber composition comprising a poly-siloxane base, at least two cross-linking agents, to create a covalent crosslink, and a filler. The composites produced by the methods referred to above result in rigid, inflexible materials having high viscosity. Such compositions each have different morphology and different behaviours. The associated time-dependent properties have so far not been investigated or exploited in such composites.

It is an object of the present invention to overcome at least one of the above-mentioned problems.

SUMMARY OF THE INVENTION

The Applicant has studied the effect of adding conducting nanomaterials (for example graphene, metallic nano-particles (MNPs), metallic nano-platelets (such as silver nano-platelets), metallic nanowires (MNWs, such as silver nanowires (AgNWs)), carbon fibres, carbon black, carbon nanotubes (CNTs), long multi-walled carbon nanotubes (LWCNTs)), to a lightly cross-linked, low molecular weight polymer (such as a silicone polymer commonly found as the novelty material Silly Putty®), which is a highly viscoelastic, non-Newtonian material under ambient conditions. At room temperature, the polymer is a viscous liquid that flows under its own weight but shows elastic behaviour when deformed at high strain-rates. Although the addition of a conducting nanomaterial, such as graphene, to the polymer increases its stiffness significantly, its viscoelastic characteristics remain. Moreover, since the conducting nanomaterial, such as graphene flakes or silver nano-platelets, are embedded in a liquid-like phase, they have considerable mobility and respond to deformation in a time-dependent manner. In particular, they form mobile networks that break and reform during mechanical deformation, dependent on both strain and time. This has led to the development of a completely new type of dynamic sensing material that can monitor deformation, impact and biomechanical functions at a level of sensitivity in strain and time that is so precise that it even allows the footsteps of small spiders to be monitored. For the purposes of this specification, the new dynamic sensing material shall be known as "G-putty".

According to the present invention there is provided, as set out in the appended claims, a composite material comprising a cross-linked, viscoelastic, non-Newtonian material and a conductive nanomaterial, characterised in that the viscoelastic material is either a low viscosity, weakly cross-linked hydrogel or a low viscosity, weakly cross-linked short-chain polymer and the conductive nanomaterial is embedded and partially mobile within the viscoelastic material.

According to the present invention, there is provided a composite material comprising a low viscosity, weakly cross-linked, viscoelastic material and a conductive nanomaterial, the low viscosity, weakly cross-linked viscoelastic material is either a long-chained hydrogel or a short-chain polymer, and the conductive nanomaterial is embedded and partially mobile within the viscoelastic material.

According to the present invention, there is provided, as set out in the appended claims, a composite material comprising a cross-linked viscoelastic material and a conductive nanomaterial, characterised in that the viscoelastic material is either a low viscosity, weakly cross-linked hydrogel or a low viscosity, weakly cross-linked short-chain polymer and the conductive nanomaterial is embedded and partially mobile within the viscoelastic material.

According to the present invention, there is provided, as set out in the appended claims, a sensing device comprising a composite material, the composite material comprising a viscoelastic, weakly cross-linked material and a conductive nanomaterial, characterised in that the viscoelastic material is a low viscosity, weakly cross-linked hydrogel or a low viscosity, weakly cross-linked short-chain polymer, and the conductive nanomaterial is embedded and partially mobile within the matrix.

In one embodiment, any deformation of the composite material results in a large fractional change in its electrical resistance.

In one embodiment, the composite material is solid-like when the conductive nanomaterial is embedded therein.

In one embodiment, the viscoelastic material is a non-Newtonian material that is fluid-like under ambient conditions prior to the addition of the conductive nanomaterial.

In one embodiment, the weakly cross-linked viscoelastic material is cross-linked by non-covalent bonds, such as hydrogen bonds.

In one embodiment, the viscoelastic material is a polymer. Preferably, the viscoelastic material is a hydrogel or a short-chain polymer. The short-chain polymer is selected from an elastomer, a thermoplastic, an adhesive, a copolymer or a biopolymer.

Ideally, the hydrogel is selected from polyethylene glycol (polyethylene oxide) and other hydrogel-forming polymers (such as sodium polyacrylate and other hydrophilic (meth)acrylates and (meth)acrylamides).

Ideally, the short-chain polymer is an elastomer selected from the group comprising polybutadiene, butadiene and acrylonitrile copolymers (NBR), natural and synthetic rubber, polyesteramide, chloropene rubbers, poly(styrene-b-butadiene) copolymers, polysiloxanes (such as Polydimethylsiloxane (PDMS) (silicone oil)), polyisoprene, polyurethane, polychloroprene, chlorinated polyethylene, polyethylene glycol (polyethylene oxide) polyester/ether urethane, polyurethane, polyethylene propylene, chlorosulphanated polyethylene, polyalkylene oxide, polyethylene oxide, flurosilicone, highly saturated nitrile (HSN, HNBR), nitrile, polyacrylate, silicone, fluorinated ethylene propylene (FEP), a perfluoroelastomer (such as Simriz®), a copolymer of tetrafluoroethylene/propylene (such as Aflas®), carboxylated nitrile, a fluoroelastomer (such as a dipolymer of hexafluoropropylene and vinylidene fluoride, Dupont Viton®), and mixtures thereof.

Ideally, the short-chain polymer is a thermoplastic selected from the group comprising acrylonitrile, butadiene styrene, polypropylene, polyethylene, polyvinylchloride, polyamide, polyester, acrylic, polyacrylic, polyacrylonitrile, polycarbonate, ethylene-vinyl acetate, ethylene vinyl alcohol, polytetrafluoroethylene, ethylene chlorotrifluoroethylene, ethylene tetrafluoroethylene, liquid crystal polymer, polybutadiene, polychlorotrifluoroehtylene, polystyrene, polyurethane, polyester resin, polysulfide, polyvinyl alcohol, polyvinyl chloride emulsion, polyvinylpyrrolidone, silicone, styrene acrylic copolymer, dichloromethane, cyanoacrylate, and polyvinyl acetate.

Ideally, the short-chain polymer is a copolymer selected from the group comprising copolymers of propylene and ethylene, Acetal copolymers (Polyoxymethylenes), Polymethylpentene Copolymer (PMP), Amorphous copolyester (PETG), acrylic and acrylate copolymers, polycarbonate (PC) copolymer, Styrene block copolymers (SBCs) to include Poly(styrene-butadiene-styrene) (SBS), Poly(styrene-isoprene-styrene) (SIS), Poly(styrene-ethylene/butylene-styrene) (SEBS), Ethylene vinyl acetate (EVA) and ethylene vinyl alcohol copolymer (EVOH).

Ideally, the short-chain polymer is a biopolymer selected from the group comprising gelatin, lignin, cellulose, polyalkylene esters, polyvinyl alcohol, polyamide esters, polyalkylene esters, polyanhydrides, polylactide (PLA) and its copolymers, and polyhydroxyalkanoate (PHA).

Preferably, the short-chain polymer is a low molecular weight short-chain polymer. Ideally, the short-chain polymer is a low molecular weight, liquid polydimethylsiloxane (PDMS) (also known as silicone oil).

A hydrogel is a water-swollen, and cross-linked hydrophilic polymeric network produced by the simple reaction of one or more monomers. These water-swellable polymeric matrices can absorb a substantial amount of water to form elastic gels, where the "matrices" are three-dimensional networks of macromolecules held together by crosslinks (covalent and non-covalent). Upon placement in an aqueous environment, dry hydrogels swell to the extent allowed by the degree of cross-linking. The most commonly used monomers in hydrogels are hydrophilic (meth)acrylates and (meth)acrylamides. It should be understood that the hydrogel can be any suitable hydrogel. For example, a typical hydrogel that can be used is made from acrylic acid and its sodium or potassium salts, and a crosslinker such as methylene bis-acrylamide (MBA) in an aqueous solution.

In one embodiment, the short-chain polymer and hydrogel is crosslinked with any reagent that forms weakly cross-linked hydrophobic or hydrophilic viscoelastic materials, respectively. Ideally, the short-chain polymer is crosslinked with Boric Acid, and the hydrogel is cross-linked with a reagent such as water or methylene bis-acrylamide (MBA) in an aqueous solution.

In one embodiment, the hydrogel is cross-linked with a combination of weak (non-covalent) and strong (covalent) cross-links.

In one embodiment, the conductive nanomaterial is selected from graphene, metallic nano-particles (MNPs), metallic nano-platelets (such as silver nano-platelets), metallic nanowires (MNWs), carbon fibres, carbon black, carbon nanotubes (CNTs), and long multi-walled carbon nanotubes (LWCNTs).

Preferably, the conductive nanomaterial is graphene or silver nano-platelets.

In one embodiment, the concentration of the conductive nanomaterial in the composite material is between about 0.5 vol. % to about 20 vol. %.

In one embodiment, the viscosity of the viscoelastic material is between about 50 Pa s and 11,000 Pa s. Ideally, the viscosity of the viscoelastic material is between about 100 Pa s and 10,000 Pa s.

In one embodiment, the composite material has a gauge factor of greater than about 50.

According to the invention described herein, there is provided, as set out in the appended claims, a sensing device comprising a composite material, the composite material comprising a cross-linked, viscoelastic material and a conductive nanomaterial, characterised in that the viscoelastic material is either a low viscosity, weakly cross-linked hydrogel or a low viscosity, weakly cross-linked short-chain polymer and that the conductive nanomaterial is embedded and partially mobile within the viscoelastic material.

In one embodiment, any deformation of the composite material results in a large fractional change in its electrical resistance.

In one embodiment, the composite material is solid-like following addition of the conductive nanomaterial.

In one embodiment of the device, the viscoelastic material is a non-Newtonian material that is fluid-like under ambient conditions prior to addition of the conductive nanomaterial.

In one embodiment, the composite material is solid-like when the conductive nanomaterial is embedded therein.

In one embodiment, the viscoelastic material is a polymer. Preferably, the viscoelastic material is a hydrogel or a short-chain polymer. The short-chain polymer is selected from an elastomer, a thermoplastic, an adhesive, a copolymer or a biopolymer.

Ideally, the hydrogel is selected from polyethylene glycol (polyethylene oxide) and other hydrogel-forming polymers (such as sodium polyacrylate and other hydrophilic (meth) acrylates and (meth)acrylamides).

Preferably, the short-chain polymer is an elastomer selected from the group comprising polybutadiene, butadiene and acrylonitrile copolymers (NBR), natural and synthetic rubber, polyesteramide, chloropene rubbers, poly(styrene-b-butadiene) copolymers, polysiloxanes (such as Polydimethylsiloxane (PDMS)), polyisoprene, polyurethane, polychloroprene, chlorinated polyethylene, polyester/ether urethane, polyurethane, polyethylene propylene, chlorosulphanated polyethylene, polyalkylene oxide, flurosilicone, highly saturated nitrile (HSN, HNBR), nitrile, polyacrylate, silicone, fluorinated ethylene propylene (FEP), a perfluoroelastomer, a fluroelastomer, a copolymer of tetrafluoroethylene/propylene, carboxylated nitrile, a dipolymer of hexafluoropropylene and vinylidene fluoride, and mixtures thereof. Preferably, the short-chain polymer is a thermoplastic selected from the group comprising acrylonitrile butadiene styrene, polypropylene, polyethylene, polyvinylchloride, polyamide, polyester, acrylic, polyacrylic, polyacrylonitrile, polycarbonate, ethylene-vinyl acetate, ethylene vinyl alcohol, polytetrafluoroethylene, ethylene chlorotrifluoroethylene, ethylene tetrafluoroethylene, liquid crystal polymer, polybutadiene, polychlorotrifluoroehtylene, polystyrene, polyurethane, polyester resin, polysulfide, polyvinyl alcohol, polyvinyl chloride emulsion, polyvinylpyrrolidone, silicone, styrene acrylic copolymer, dichloromethane, cyanoacrylate, and polyvinyl acetate. Preferably, the short-chain polymer is a copolymer selected from the group comprising copolymers of propylene and ethylene, Acetal copolymers (Polyoxymethylenes), Polymethylpentene Copolymer (PMP), Amorphous copolyester (PETG), acrylic and acrylate copolymers, polycarbonate (PC) copolymer, Styrene block copolymers (SBCs) to include Poly (styrene-butadiene-styrene) (SBS), Poly(styrene-isoprene-styrene) (SIS), Poly(styrene-ethylene/butylene-styrene) (SEBS), Ethylene vinyl acetate (EVA) and ethylene vinyl alcohol copolymer (EVOH). Preferably, the short-chain polymer is a biopolymer selected from the group comprising gelatin, lignin, cellulose, polyalkylene esters, polyvinyl alcohol, polyamide esters, polyalkylene esters, polyanhydrides, polylactide (PLA) and its copolymers, and polyhydroxyalkanoate (PHA).

Preferably, the short-chain polymer is a low molecular weight short-chain polymer. Ideally, the short-chain polymer is a low molecular weight, liquid polydimethylsiloxane (PDMS) (also known as silicone oil).

In one embodiment of the device, the short-chain polymer and hydrogel is crosslinked with any reagent that forms weakly crosslinked hydrophobic or hydrophilic viscoelastic materials, respectively. Ideally, the short-chain polymer is crosslinked with Boric Acid, and the hydrogel is cross-linked with a reagent such as water or methylene bis-acrylamide (MBA) in an aqueous solution.

In one embodiment, the hydrogel is cross-linked with a combination of weak (non-covalent) and strong (covalent) cross-links.

In one embodiment of the device, the concentration of the conductive nanomaterial in the composite material is between about 0.5 vol. % to about 20 vol. %.

In one embodiment of the device, the viscosity of the weakly cross-linked short chain polymer or hydrogel is between about 50 Pa s and 11,000 Pa s. Ideally, the viscosity of the weakly cross-linked short chain polymer or hydrogel is between about 100 Pa s and 10,000 Pa s.

In one embodiment, the composite material has a gauge factor of greater than about 50.

In one embodiment, the conductive nanomaterial is selected from graphene, metallic nano-particles (MNPs), metallic nano-platelets, metallic nanowires (MNWs), carbon fibres, carbon black, carbon nanotubes (CNTs), and long multi-walled carbon nanotubes (LWCNTs). Ideally, the conductive nanomaterial is graphene or silver nanoplatelets.

In one embodiment, the device is configured to measure joint movement, heart function, respiratory response, impact sensing, blood pressure, pulse, motion, position, velocity or acceleration, vibration. The vibration can be any vibration from an engine, a moving part in an instrument, the vibration of terra firma, from footsteps or footfall or the vibration caused by the movement of an animal or insect, and the like.

According to the invention described herein, there is provided, as set out in the appended claims, a process for producing the composite material described above, the process comprising the steps of:

mixing a conductive nanomaterial in a solvent, a water-surfactant solution or a water-polymer solution;

transferring the mixed conductive nanomaterial to a solvent to form a dispersed nanomaterial solution;

mixing the solution with a viscoelastic material and applying energy to form a homogenised mixture;

optionally, heating the homogenised mixture to evaporate the solvent; and allowing the mixture to cool so as to form the composite material.

In one embodiment, the process further comprises the step of folding the mixture under heat prior to allowing the mixture to cool.

In one embodiment, the process further comprises the step of mixing the composite material further with the viscoelastic material to produce composite materials with varying concentrations of conductive nanomaterial.

In one embodiment, the concentration of conductive nanomaterial in the composite material is between about 0.5 vol % to about 20 vol %.

In one embodiment, residual solvent is removed by placement of the mixture in a vacuum oven or by other suitable means such as heating.

In one embodiment, the viscoelastic material is a non-Newtonian material that is fluid-like under ambient conditions prior to the conductive nanomaterial being embedded therein.

In one embodiment, the viscoelastic material is weakly cross-linked by non-covalent linkages such as hydrogen bonds.

In one embodiment, the viscoelastic material is a polymer. Preferably, the viscoelastic material is a hydrogel or a short-chain polymer. The short-chain polymer is selected from an elastomer, a thermoplastic, an adhesive, a copolymer or a biopolymer.

Ideally, the hydrogel is selected from polyethylene glycol (polyethylene oxide) and other hydrogel-forming polymers (such as sodium polyacrylate and other hydrophilic (meth) acrylates and (meth)acrylamides).

Ideally, the viscoelastic material is an elastomer selected from the group comprising polybutadiene, butadiene and acrylonitrile copolymers (NBR), natural and synthetic rubber, polyesteramide, chloropene rubbers, poly(styrene-b-butadiene) copolymers, polysiloxanes (such as Polydimethylsiloxane (PDMS) (silicone oil)), polyisoprene, polyurethane, polychloroprene, chlorinated polyethylene, polyethylene glycol (polyethylene oxide), polyester/ether urethane, polyurethane, polyethylene propylene, chlorosulphanated polyethylene, polyalkylene oxide, flurosilicone, highly saturated nitrile (HSN, HNBR), nitrile, polyacrylate, silicone, fluorinated ethylene propylene (FEP), a perfluoroelastomer (such as Simriz®), a copolymer of tetrafluoroethylene/propylene (such as Aflas®), carboxylated nitrile, a fluoroelastomer (such as a dipolymer of hexafluoropropylene and vinylidene fluoride, Dupont Viton®), and mixtures thereof.

Ideally, the viscoelastic material is a thermoplastic selected from the group comprising acrylonitrile butadiene styrene, polypropylene, polyethylene, polyvinylchloride, polyamide, polyester, acrylic, polyacrylic, polyacrylonitrile, polycarbonate, ethylene-vinyl acetate, ethylene vinyl alcohol, polytetrafluoroethylene, ethylene chlorotrifluoroethylene, ethylene tetrafluoroethylene, liquid crystal polymer, polybutadiene, polychlorotrifluoroehtylene, polystyrene, polyurethane, polyester resin, polysulfide, polyvinyl alcohol, polyvinyl chloride emulsion, polyvinylpyrrolidone, silicone, styrene acrylic copolymer, dichloromethane, cyanoacrylate, and polyvinyl acetate.

Ideally, the viscoelastic material is a copolymer selected from the group comprising copolymers of propylene and ethylene, Acetal copolymers (Polyoxymethylenes), Polymethylpentene Copolymer (PMP), Amorphous copolyester (PETG), acrylic and acrylate copolymers, polycarbonate (PC) copolymer, Styrene block copolymers (SBCs) to include Poly(styrene-butadiene-styrene) (SBS), Poly(styrene-isoprene-styrene) (SIS), Poly(styrene-ethylene/butylene-styrene) (SEBS), Ethylene vinyl acetate (EVA) and ethylene vinyl alcohol copolymer (EVOH).

Ideally, the viscoelastic material is a biopolymer selected from the group comprising gelatin, lignin, cellulose, polyalkylene esters, polyvinyl alcohol, polyamide esters, polyalkylene esters, polyanhydrides, polylactide (PLA) and its copolymers, and polyhydroxyalkanoate (PHA).

In one embodiment, the viscoelastic material is a low molecular weight, liquid polydimethylsiloxane (PDMS) (or silicone oil) or a hydrogel. Preferably, the PDMS is cross-linked with any reagent that forms weakly crosslinked hydrophobic viscoelastic materials, such as Boric Acid, and the hydrogel is weakly crosslinked with any reagent that forms weakly crosslinked hydrophilic viscoelastic materials, such as water or methylene bis-acrylamide (MBA) in an aqueous solution.

In one embodiment, the hydrogel is cross-linked with a combination of weak (non-covalent) and strong (covalent) cross-links.

In one embodiment, the conductive nanomaterial is selected from graphene, metallic nano-particles (MNPs), metallic nano-platelets (such as silver nano-platelets), metallic nanowires (MNWs), carbon fibres, carbon black, carbon nanotubes (CNTs), and long multi-walled carbon nanotubes (LWCNTs).

Preferably, the conductive nanomaterial is graphene or silver nano-platelets.

In one embodiment, when the conductive nanomaterial is graphene, the process further comprises the step of exfoliating graphite in a solvent, a water-surfactant solution or a water-polymer solution to provide dispersed graphene nanosheets prior to the step of transferring the graphene nanosheets to a solvent to form a dispersed graphene solution.

The term "conductive nanomaterial" should be understood to mean any conductive material with dimensions in the nanoscale. Examples of conductive nanomaterials are metallic nano-particles (MNPs), metallic nano-platelets (such as silver nano-platelets), metallic nanowires (MNWs, such as silver nanowires (AgNWs)), carbon fibres, carbon black, carbon nanotubes (CNTs), long multi-walled carbon nanotubes (LWCNTs).

The term "polymer" in the specification should be understood to mean a large molecule (macromolecule) composed of repeating structural units. These subunits are typically connected by covalent chemical bonds. Although the term "polymer" is sometimes taken to refer to plastics, it actually encompasses a large class comprising both natural and synthetic materials with a wide variety of properties. In the specification, such polymers are synthetic and naturally occurring elastomers. Such polymers may be thermoplastics, elastomers, or biopolymers.

An example of a polymer is polyester. Polyester is a relatively strong but cheap commodity fibre material. While stronger polymers exist (e.g. Kevlar), they tend to be much more expensive. By first exfoliating the 3-dimensional layered material in a solvent before mixing into the liquid product, a uniform composite with well dispersed exfoliated 2-dimensional nano-sheets is produced with minimal aggregates. The process is compatible with existing melt processing techniques. Thus, it opens the way to cheap melt-processed polyester based fibres with strength entering the realm of high performance fibres.

In addition, polyester is a material which is heavily recycled. Each time it is recycled, its strength degrades slightly due to the introduction of defects, reductions in molecular weight, chain shortening etc. Addition of graphene or other suitable exfoliated 2-dimensional layered materials during recycling could increase the strength of the recycled plastic to its original level, thereby mitigating much of the reduction in strength currently observed and significantly increasing the number of times a given plastic can be recycled during its lifetime.

The term "copolymer" should be understood to mean a polymer derived from two (or more) monomeric species, for example a combination of any two of the below-mentioned polymers. An example of a copolymer, but not limited to such, is PETG (Polyethylene Terephthalate Glycol), which is a PET modified by copolymerization. PETG is a clear amorphous thermoplastic that can be injection moulded or sheet extruded and has superior barrier performance used in the container industry.

In one embodiment of the present invention, the composite product may comprise a mass of the exfoliated, layered graphene of between about 0.01 vol % to about 30 vol %, preferably between about 0.05 vol % to about 25 vol %, more preferably between about 0.075 wt % to about 20 vol %, ideally about 0.1 vol % to about 18 vol %, and particularly about 0.1 vol % to about 16 vol %. Preferably, between about 0.5 vol % to about 20 vol %.

In one embodiment of the present invention, there is provided a composite material produced by the process described herein selected from the group comprising a Polydimethylsiloxane (PDMS)-graphene composite, a hydrogel-silver nanoplatelet composite, a polyester-graphene composite, a polyvinyl acetate-graphene composite, an acrylonitrile butadiene styrene-graphene composite, a polypropylene-graphene composite, a polyethylene-graphene composite, a polyvinylchloride-graphene composite, a polyamide-graphene composite, an acrylic-graphene composite, a polyacrylic-graphene composite, a polyacrylonitrile-graphene composite, a polycarbonate-graphene composite, an ethylene-vinyl acetate-graphene composite, an ethylene vinyl alcohol-graphene composite, a polytetrafluoroethylene-graphene composite, an ethylene chlorotrifluoroethylene-graphene composite, an ethylene tetrafluoroethylene-graphene composite, a polybutadiene-graphene composite, a polychlorotrifluoroehtylene-graphene composite, a polystyrene-graphene composite, a polyurethane-graphene composite, a polyvinyl acetate-graphene composite. It should be understood that the composite products listed above may have graphene substituted for any conductive nanomaterial, such as silver nano-platelets.

In the specification, the term "pristine putty" or "putty" should be understood to mean putty without graphene or any conductive nanomaterial embedded therein.

In the specification, the term "low molecular weight Polydimethylsiloxane (PDMS)" should be understood to mean a PDMS polymer with relatively short chain length. Ideally this would refer to molecular weights below the critical molecular weight for entanglement. PDMS is also known as silicone oil. The two terms can be used interchangeably.

In the specification, the term "cross-linked" should be understood to mean a bond that links one polymer chain to another. They can be van der Waals, covalent bonds or ionic bonds. The crosslinking of polymers via covalent bonds are typical of the cross-links formed in US 2014/011969 A1 and US 2016/033403 A1. Such covalently bonded crosslinks produce very rigid, inflexible crosslinked polymers (materials). They create bonds between polymer chains or between polymers and embedded particles which are permanent and very strong. For example, if two short chain PDMS molecules (e.g. silicone oil) were covalently cross-linked, they would make a longer chain PDMS molecule with none of the character of the short chains remaining. Such covalently bonded crosslinked polymers are strong and permanent. These types of cross-linked polymers are unsuitable for use in the devices and composite materials described herein.

In the specification, the term "weak cross-link", "transient cross-link", or "temporary cross-link", all of which can be used interchangeably, should be understood to mean when a cross linking agent connects two polymer chains via weak, non-covalent bonds, such as hydrogen bonds or dipolar interactions These links are transient, lasting typically about 1 second before they break. They can later reform in the same place or elsewhere within the matrix. The key fact is that while broken, the polymer chains can move relative to their original positions. This results in very low viscosity (i.e. low for a solid, between about 50 to 11,000 Pa s). The physical properties (viscosity and sensitivity) of a polymer with transient (non-covalent) cross-link bonds are significantly very different to a polymer with permanent or covalent cross-linked bonds. These types of weakly cross-linked polymers are suitable for use in the devices and composite materials described herein.

In the specification, the term "low viscosity" should be understood to mean a non-covalent cross-linked polymer, without the addition of a conductive nanomaterial, having a viscosity no higher than about 11,000 Pa s and no lower than about 50 Pa s. Ideally, the non-covalent cross-linked polymer with low viscosity has a viscosity no higher than about 10,000 Pa s and no lower than about 100 Pa s; that is, between about 100, 110, 120, 130, 140, 150, 160, 170, 180, 190, 200, 220, 240, 260, 280, 300, 320, 340, 360, 380, 400, 420, 440, 460, 480, 500, 520, 540, 560, 580, 600, 620, 640, 660, 680, 700, 720, 740, 760, 780, 790, 800, 820, 840, 860, 880, 900, 920, 940, 960, 980, 1000, 1200, 1400, 1600, 1800, 2000, 2200, 2400, 2600, 2800, 3000, 3200, 3400, 3600, 3800, 4000, 4200, 4400, 4600, 4800, 5000, 5200, 5400, 5600, 5800, 6000, 6200, 6400, 6600, 6800, 7000, 7200, 7400, 7600, 7800, 8000, 8200, 8400, 8600, 8800, 9000, 9200, 9400, 9600, 9800, 10000, 10200, 10400, 10600, 10800, 11000 Pa s.

In the specification, the term "high viscosity" should be understood to mean a covalent cross-linked polymer, without the addition of a conductive nanomaterial, having a viscosity higher than about 11,001 Pa s.

In the specification, the term "monotonicity" or "monotonic" should be understood to mean a material having the property either of never increasing or of never decreasing as the values of the independent variable or the subscripts of the terms increase.

In the specification, the term "low strain" in relation to the composite material (G-putty) should be understood to mean strains approaching 0% e.g. <5%.

In the specification, the term "high (or higher) strain" in relation to the composite material (G-putty) should be understood to mean strains outside the low strain region e.g. >5%.

In the specification, the term "ambient conditions" should be understood to mean the environmental conditions of the surrounding area.

In the specification, the term "metallic nano-particles (MNPs)" should be understood to mean nanosized metals with dimensions (length, width or thickness) within the size range of 1-100 nm. Examples of such MNPs are silver or gold nanoparticles.

In the specification, the term "metallic nano-platelets" should be understood to mean nanosized metals formed as a sheet with diameters ranging from sub-micron to 100 microns, and 1 to 100 nm thick. The most common examples of such platelets are silver nano-platelets.

In the specification, the term "metallic nanowires (MNWs)" should be understood to mean nanosized metallic structures with a diameter within the size range of nanometers. It can also be defined as the ratio of the length to width being greater than 1000. Alternatively, nanowires can be defined as structures that have a thickness or diameter constrained to tens of nanometers or less and an unconstrained length. Examples of such MNWs are silver nanowires, nickel nanowires, platinum nanowires, gold nanowires, and bi- or tri-elemental nanowires made from alloys or core-shell structures.

In the specification, the term "carbon black" should be understood to mean a fine carbon powder made by burning hydrocarbons in insufficient air.

In the specification, the term "partially mobile" should be understood to mean that the conductive nanomaterials have a limited degree of movement within the polymer matrix. This mobility is associated with the low viscosity of the matrix and can be via rotational or translational diffusion or be driven by an electric field e.g. via induced dipoles.

In the specification, the term "solid-like" should be understood to mean a viscoelastic material which behaves more like a solid than a liquid. This can be quantified by defining a solid like material as one where the storage modulus (G') is larger than the loss modulus (G") when both are measured in the low-strain plateau i.e. G'>G". Conversely, "liquid-like" should be understood to mean a viscoelastic material which behaves more like a liquid than a solid and is quantified by G'<G".

In the specification, the term "low-molecular weight polymer" should be understood to mean a polymer having a weight-average molecular weight of between 5,000 to 50,000 g/mol ($M_w$).

In the specification, the term "short-chain polymer" should be understood to mean a polymer having between 50 and 500 repeat monomer units; preferably between 100 and 400 repeat monomer units; more preferably between 150 and 350 repeat monomer units. It should be understood that the short-chain polymer can comprise a mixture of monomer units from different sources.

In the specification, the term "fractional change in electrical resistance" should be understood to mean that when a strain is applied to the composite material described herein, the deformation of the material is registered by measuring the change in electrical resistance. A large change in fractional resistance would be anything larger than a 10% change at a strain of 1%.

BRIEF DESCRIPTION OF THE DRAWINGS

The invention will be more clearly understood from the following description of an embodiment thereof, given by way of example only, with reference to the accompanying drawings, in which:

FIG. 9A illustrates a measurement of putty viscosity from different silicone oil molecular weight, $M_w$. Silicone oil of four different molecular weights, 15, 30, 60 and 100 kg/mol was used. The different molecular weights are due to different degrees of polymerization. The oils were crosslinked using boric acid, as described in the methods, to form Silly Putty®. The loss and storage modulus versus oscillatory frequency was measured as described above ($\gamma_0$=0.1%). The loss modulus (G'') was transformed into dynamic viscosity using $\eta'$=G''/$\omega$ which is plotted versus $\omega$ for each putty (no graphene) in A. The zero shear viscosities were then extracted by averaging $\eta'$ over the frequency range below 1 rad/s. These values can be thought of as the putty or matrix viscosity. FIG. 9B is a graph illustrating the sensitivity of G-putty plotted versus the viscosity of the cross-linked polymer matrix (but before graphene was added to the G-putty). The matrix viscosity was extracted from the flat, low-frequency portion of dynamic viscosity vs. frequency plots. The range of sensitivities that can be achieved with G-putty range from 10 to 500, where higher is better. The sensitivity value of G-putty can be controlled by controlling the molecular weight of silicone oil, boric acid content, details of synthesis, graphene content etc.

DETAILED DESCRIPTION OF THE DRAWINGS

Methods

Figure 1:
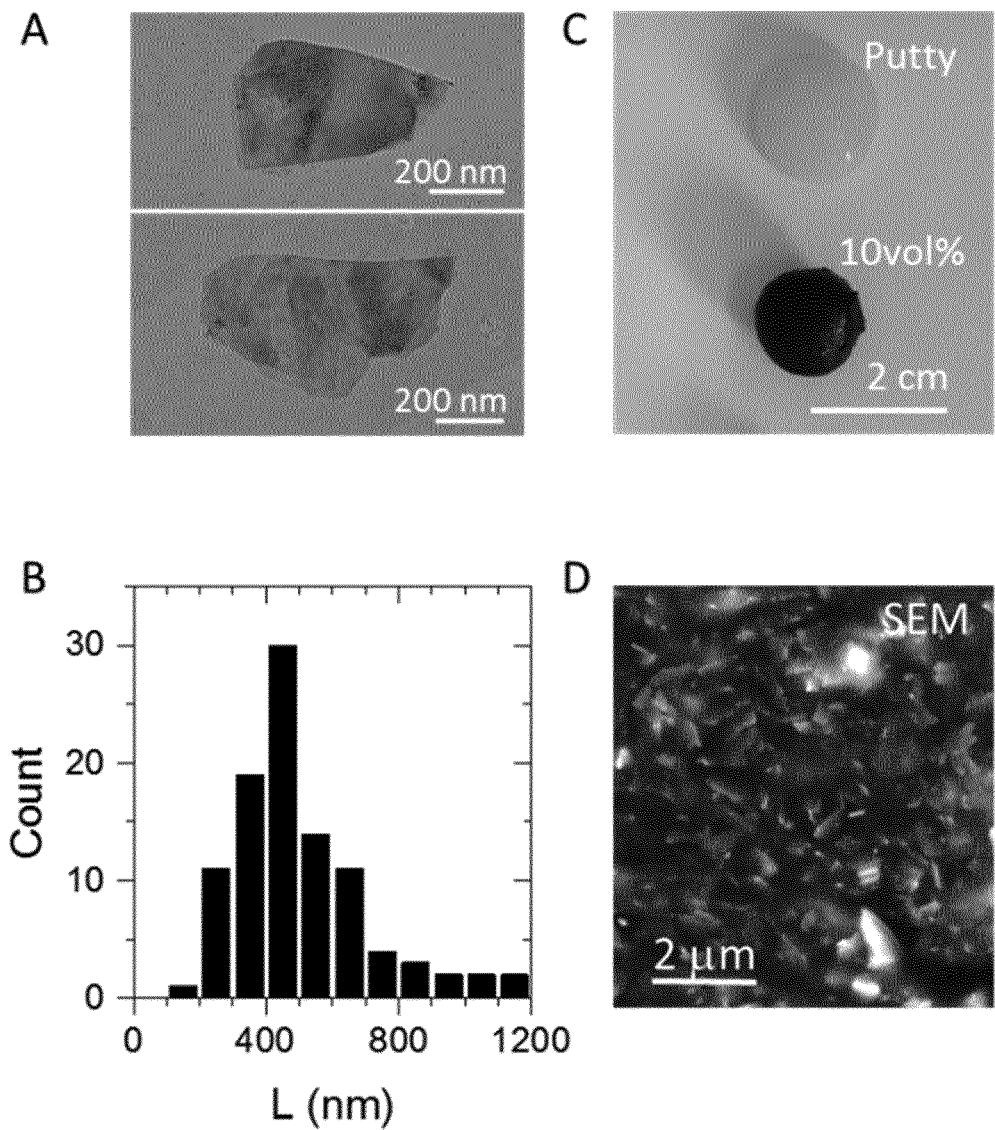
FIG. 1: Basic characterisation of G-putty strain sensors. A) Transmission Electron Microscopy (TEM) images and B) statistical analysis of lateral size, L, for liquid-exfoliated graphene nanosheets. C) Photograph of hand-rolled spheres of putty and G-putty containing 10 vol % graphene. D) SEM image of the surface of G-putty (8 wt %) showing graphene sheets. E-F) ATF-FTIR (E) and Raman (F) spectra of putty and G-putty (8 wt %). All spectra are dominated by features associated with the putty except the Raman spectrum of G-putty which is dominated by graphene bands. The feature at 1340 cm-1 in E is associated with B—O—Si crosslinks. G-H) Electrical conductivity of G-putty as a function of (G) graphene mass fraction, Mf, and (H) reduced graphene volume fraction, φ-φc, where φ is the volume fraction and 4c is the electrical percolation threshold. Percolation fit parameters are given in panel H.
Figure 1:
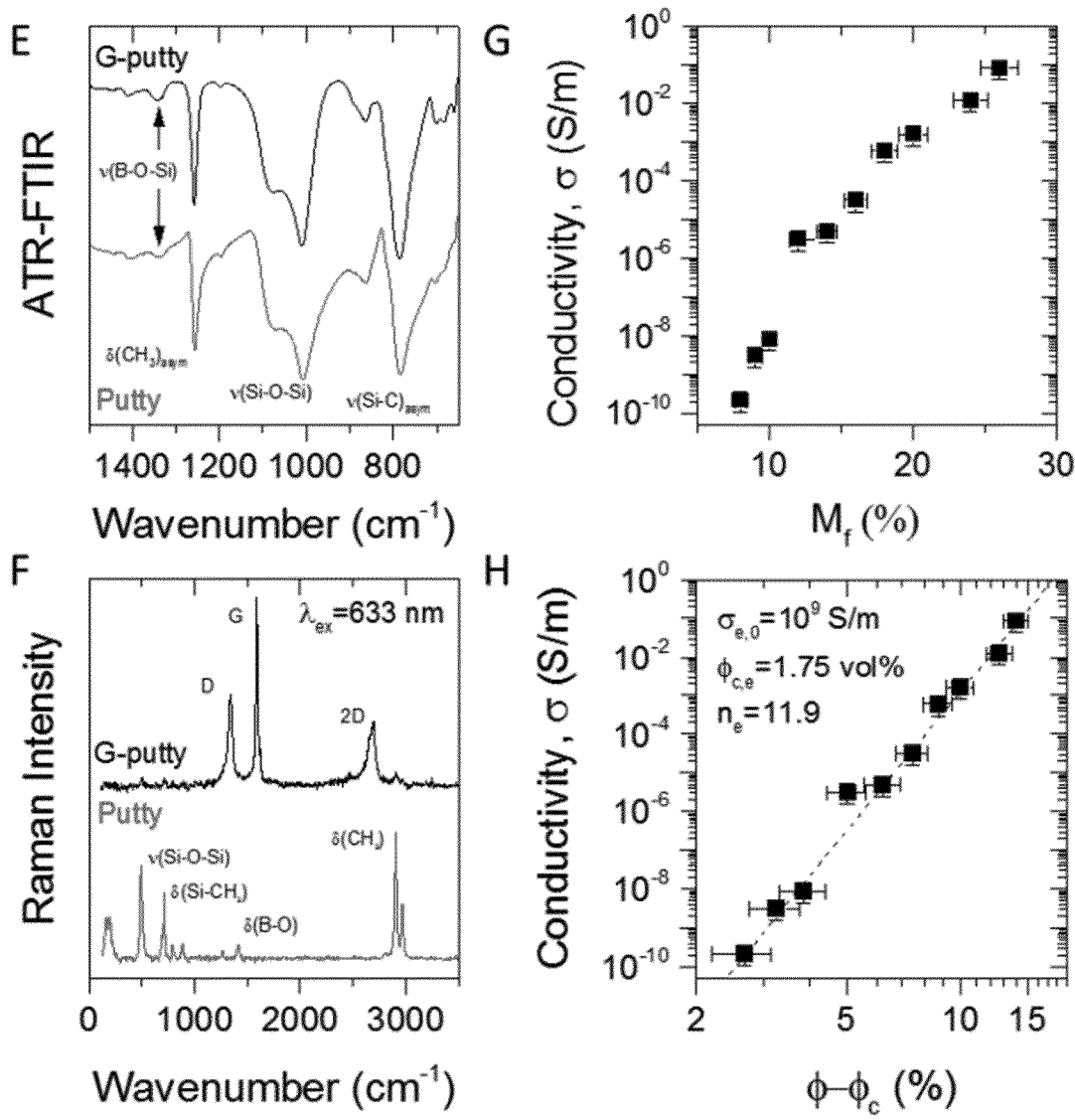

Graphene dispersions were prepared by the ultrasonic tip-sonication of graphite (Branwell, Graphite Grade RFL 99.5) in N-methyl-pyrrolidone (NMP) at 100 mg/mL (total volume ~300 mL) for 72 hrs at 80% amplitude. This was followed by a mild centrifugation at 1500 rpm for 90 min to remove unexfoliated aggregates and very large nanosheets. This dispersion was then vacuum filtered onto a 0.1 μm pore size polyester membrane to form a thick film of reaggregated nanosheets. This film was then redispersed at high concentration (~10 mg/mL) in chloroform by ultrasonic tip-sonication for ~1.5 hrs. Boric acid was mixed with low molecular weight, liquid PDMS (Silicone Oil) until homogeneous. The mixture was slowly heated up to ~190° C. and left for ~1 hr stirring at constant temperature forming a viscous, sticky gum that when left to cool formed a viscoelastic putty with non-covalently bonded, transient cross-links.

The putty was placed directly into the previously-prepared graphene/chloroform dispersion and homogenized through stirring and bath sonication to form a stock composite dispersion (mass fraction, Mf~26 wt %; $\phi$~16 vol %). The stock was left on a hot plate (~45° C. for ~6 hrs) to evaporate the solvent, leaving a dark grey paste. Any residual solvent was removed in a vacuum-oven (~120° C. at ~900 mbar for 1 hr) to form a dark coloured, composite putty (G-putty). The composite putty was mixed further by repeated folding on a hotplate (~70° C. for ~45 mins). The pristine putty (putty minus graphene) was mixed with portions of the composite putty to produce an array of samples of G-putty with varying graphene content (~1 vol % to ~16 vol %) using this folding process.

Rheological measurements were obtained using an Anton Paar MCR 301 rheometer with a PP25, 25 mm diameter parallel plate geometry. Electro-mechanical measurements for both tensile and compressive tests were performed using a Keithley KE2601 source meter in 2-probe mode, controlled by LabView software, in conjunction with a Zwick Z0.5 ProLine Tensile Tester (100 N Load Cell).

All application tests (joint movement, heart function, respiratory response, and impact sensing) were performed by measuring electrical response of ~7 vol % G-putty as a function of time. Finally, the electrical response of a cellar spider (*Pholcus phalangioides*) walking across a layer of the ~7 vol % putty covered in a layer of polyvinyl chloride (kitchen plastic wrap (Clingfilm)) was measured.

Production of Covalently Crosslinked Composite Material

Polydimethylsiloxane (PDMS) is heated to a high temperature in the presence of air. Through active points brought about by oxidation of methyl groups, permanent cross-links between the polymer chains are formed. This decreases the flexibility of the PDMS chain and increases the viscosity of the oil. The reaction is continued until the gelation point is reached and the oil becomes an elastic solid. Reaction time is dependent on the molecular weight and heating temperature.

Graphene is infused into the polymer matrix by immersing the cross-linked polymer into a graphene-solvent dispersion and gradually heated.

Production of a Non-Covalently Cross-Linked Hydrogel Composite

Polyethylene Oxide (Mw: 600,000) is hand mixed with sliver nano-platelet (flake)/water dispersion until a gum is formed. The gum is then moulded into a cylinder for testing.

Results and Discussion

Preparation and Characterisation of G-Putty Having Non-Covalent, Transient Crosslinks In order to prepare G-putty, graphene was produced by liquid phase exfoliation of graphite in NMP solvent as previously described (see Hernandez Y, Nicolosi V, Lotya M, Blighe F M, Sun Z, De S, et al. High-yield production of graphene by liquid-phase exfoliation of graphite. Nat. Nanotechnol. 2008, 3(9): 563-568; and Khan U, O'Neill A, Lotya M, De S, Coleman J N. High-concentration solvent exfoliation of graphene. Small 2010, 6(7): 864-871). This process gives high-quality nanosheets with lateral size typically ~300-800 nm (FIG. 1 A-B), which are strong and conductive and so ideal for composite applications. These nanosheets were then transferred to chloroform and mixed with silicone oil (very low molecular weight polydimethylsiloxane (PDMS)) that had been crosslinked with boric acid (see methods). It is important to emphasise that before crosslinking, the silicon oil is a liquid. The crosslinking transforms it into a viscoelastic material. As shown herein, adding graphene further modifies the material, changing its electromechanical properties dramatically resulting in an unprecedented composite sensing material. Thus, the processing route taken here is a non-standard process, as all other PDMS-based composites start with a solid polymer.

Figure 2:
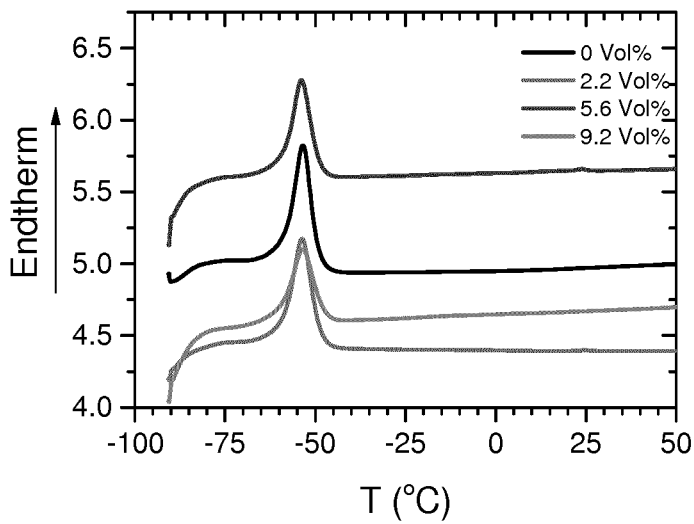
FIG. 2: Differential scanning calorimetry measurements of putty and G-putty with different loading levels between 0 and 9.2 vol %. The peak at ~-55° C. is invariant with graphene content and is due to melting of polymer crystallites. It is at the temperature expected from the literature. In polymers, the glass transition temperature is always below the melt temperature which means Tg<-55° C. This is consistent with the literature which places Tg for PDMS at ~-120° C. This means all room temperature measurements probe the putty in its viscoelastic liquid-like state.

After careful mixing, a master batch of G-putty was obtained that could be mixed with pristine putty to give samples with a range of graphene contents. The pristine putty was soft, adhesive and extremely malleable (FIG. 1C), flowing over time to take the shape of its container. However, on addition of graphene, the putty became noticeably stiffer, losing some of its fluid-like nature. Scanning Electron Microscopy (SEM) imaging showed the G-putty to contain large quantities of nanosheets arranged in a dense network (FIG. 1D). Infrared and Raman spectroscopic characterisation (FIG. 1E-F) confirmed the presence of graphene and PDMS, with the IR band at 1340 cm$^{-1}$, demonstrating the presence of B—O—Si crosslinks. Differential scanning calorimetry measurements (FIG. 2) confirm the glass transition temperature to be well below room temperature, meaning all ambient measurements probe the putty in its viscoelastic liquid-like state.

The electrical conductivity of the G-putty was found to increase strongly with graphene mass fraction, reaching ~0.1 S/m at a loading of 26 wt % (FIG. 1G). The relationship between composite conductivity and filler loading (expressed as volume fraction, $\phi$) is described by percolation theory. Here, the critical loading level where the incipient graphene network first spans the whole sample, and so can first carry current, is the percolation threshold, $\phi_{c,e}$. Above this, the conductivity scales as:

$$\sigma_e \propto (\phi - \phi_{c,e})^{n_e} \qquad (1)$$

where $n_e$ is the percolation exponent. As shown in FIG. 1H, this equation describes the data well, giving $\phi_{c,e}$=1.75 vol % and $n_e$=11.9. While the percolation threshold is as expected, the exponent is large, consistent with a very broad distribution of inter-sheet junction resistances.

Figure 3:
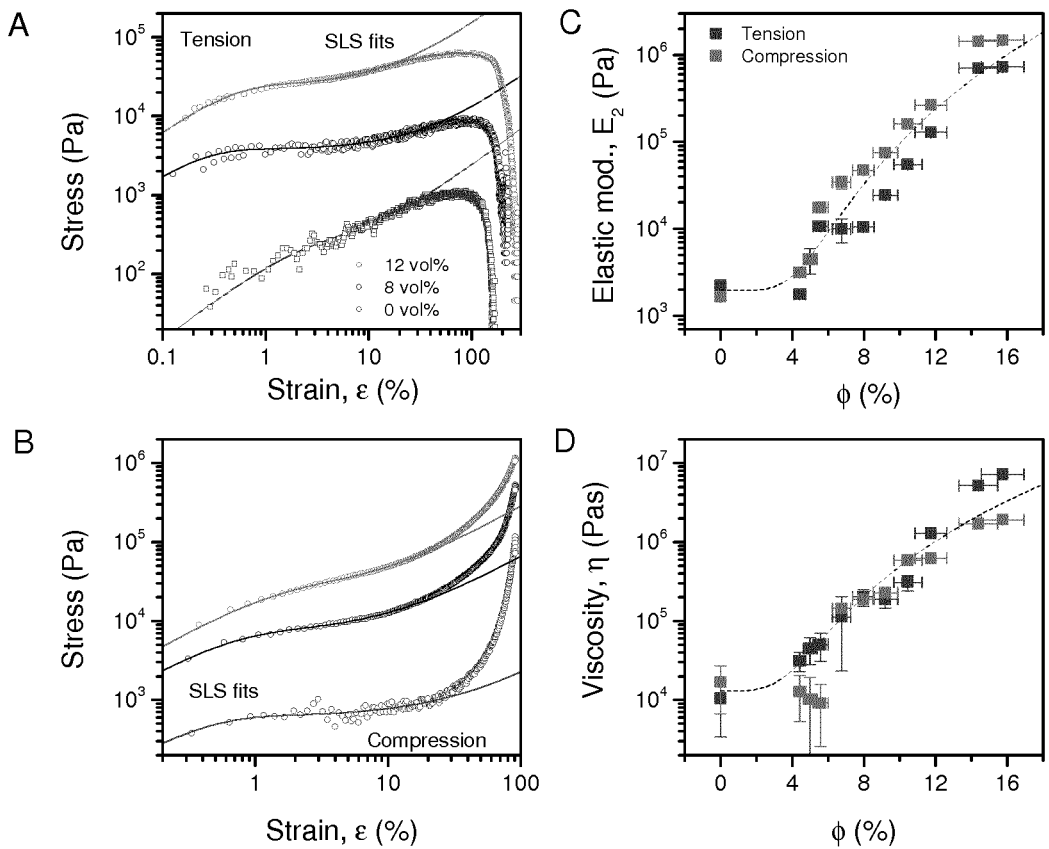
FIG. 3 A-B) Selected stress-strain curves measured in (A) tension and (B) compression. The lines are fits to equation 2 which models a standard linear solid (inset in B). The legend in A applies to both A and B. C-D) Volume fraction (φ) dependence of SLS modulus, E2, (C) and viscosity, η, (D) as extracted from the stress strain curves in A-B by fitting to equation 2. The legend in C applies to both C and D.

Viscoelastic Characterisation of G-Putty Having Non-Covalent, Transient Crosslinks The addition of graphene would be expected to affect the mechanical properties of the putty strongly, as shown in FIGS. 3 A-B for both tensile and compressive deformation. Addition of graphene increases both the stiffness and strength of the putty dramatically. For example, the stiffness, or modulus, (E) increases from E-100 kPa for the putty to E-50 MPa for the 16 vol % sample. Previous work has used the standard linear solid (SLS) model to describe the viscoelastic properties of Silly Putty®. This approach models the material as the spring/dashpot combination shown in FIG. 3B (inset) and predicts that, at low strain, the stress strain ($\sigma_m$-$\varepsilon$) curve is described by:

$$\sigma_m = E_2 \varepsilon + \eta \dot{\varepsilon}(1 - e^{\varepsilon/\dot{\varepsilon}\tau}) \qquad (2)$$

where $\dot{\varepsilon}$ is the strain rate, $\eta$ is the viscosity, $\tau = \eta/E_1$ is the relaxation time and $E_1$ and $E_2$ are elastic moduli. This model fits the data extremely well for all graphene contents and strain rates for $\varepsilon$<20-30% (solid lines). Shown in FIG. 3 C-D are the fit values of $E_2$ and $\eta$, plotted versus $\phi$. The putty displays very small values of $E_2$ and $\eta$ which increase dramatically as $\phi$ is increased. This is very important as it clearly shows how the addition of the graphene dramatically increases the mechanical properties. While other research has shown the stiffness of the polymer to increase with graphene content, very little work has described how the viscosity increases. The important result here is that the viscosity starts very low which is unusual for a polymer and increases dramatically on adding graphene.

Stress Relaxation and Graphene Mobility

An important property of viscoelastic materials is stress relaxation where the stress generated in response to a fixed strain decays over time due to molecular relaxation. In layman's terms, when a viscoelastic polymer is stretched, it initially resists the deformation by exerting a stress and pulling back (think of stretching a rubber band—it pulls back). However, over time, the molecules in the polymer move around in response to the deformation and as a result the material cannot exert so much stress—the amount it pulls back weakens over time. The stress relaxation modulus (SRM, i.e. stress/applied strain) is a measure of how hard it pulls back. The SRM was measured as a function of time after stretching by a strain of 2%, as shown in FIG. 4A. It was found that the SRM falls over time as would be expected for a viscoelastic polymer with the detailed response changing somewhat as graphene is added.

However, the SRM is largely controlled by the relaxation (molecular motion) of the polymer with perhaps some contribution from the graphene with the measured response fairly standard in viscoelastic materials. However, unlike the polymer chains, because the graphene flakes are big they should be immobile and not move around after the deformation has been applied. In these composites though, the composite was prepared from silicon oil which has very low molecular weight. As a result, the polymer viscosity is low, ~$10^4$ Pa s (FIG. 3D), potentially low enough for the graphene sheets and even the graphene network to move around slowly after the deformation. Observation of such behaviour would be unprecedented. This was tested by monitoring the response of the G-putty's electrical resistance to a 2% step strain (applied at t=$t_0$). Because current flows only through the graphene network, any motion of the sheets or the network as a whole will be reflected by changes in resistance over time. As shown in FIG. 4C, the resistance increases sharply on application of the strain due to the network deformation on stretching. This is normal behaviour. However, after the initial deformation ended (a fraction of a second after t=$t_0$), it was seen that the resistance slowly decays over hours, eventually saturating at a value measurably smaller than the initial resistance. This is very unusual behaviour and means the graphene nanosheets are mobile and can move slowly in the stretched polymer to find more favourable positions/orientations.

While not being bound by theory, this behaviour is interpreted as the strain rapidly deforming the network and breaking nanosheet-nanosheet connections, thus increasing the resistance. Because the matrix is viscoelastic with low viscosity ($10^3$-$10^4$ Pa s, see FIG. 3D), the nanosheets are somewhat mobile, allowing the network to relax, slowly re-forming connections, giving a resistance decrease. This mechanism is supported by estimating diffusional motion of the nanosheets within the putty matrix, finding displacements of ~10 nm in times of 100 s are possible. This level of mobility can explain the re-formation of connections by nanosheet relaxation.

Figure 4:
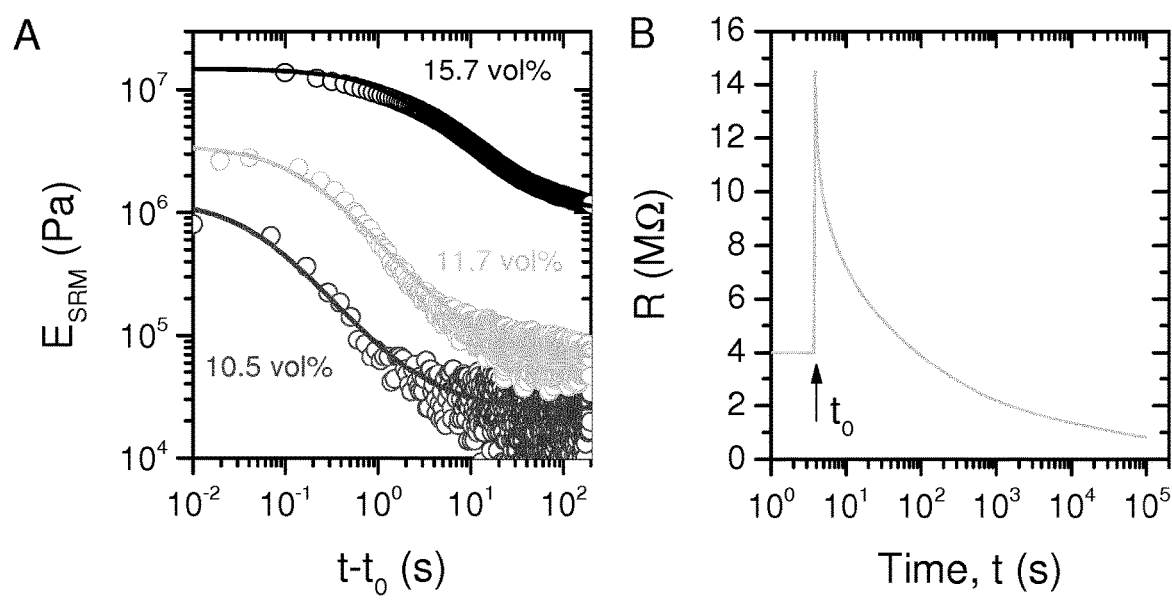
FIG. 4: Mechanical and electrical response to a rapid mechanical deformation. A) Stress relaxation modulus plotted versus time after application of a 2% tensile strain step. B) Electrical resistance of a φ=11.7% G-putty piece (9 mm×2.2 mm) exposed to a tensile step strain (at t=t0, the strain increased from 0% to 2% at a rate of 0.2 s−1). In response to the step strain, the resistance immediately increased and then decayed slowly before saturating.
Figure 5:
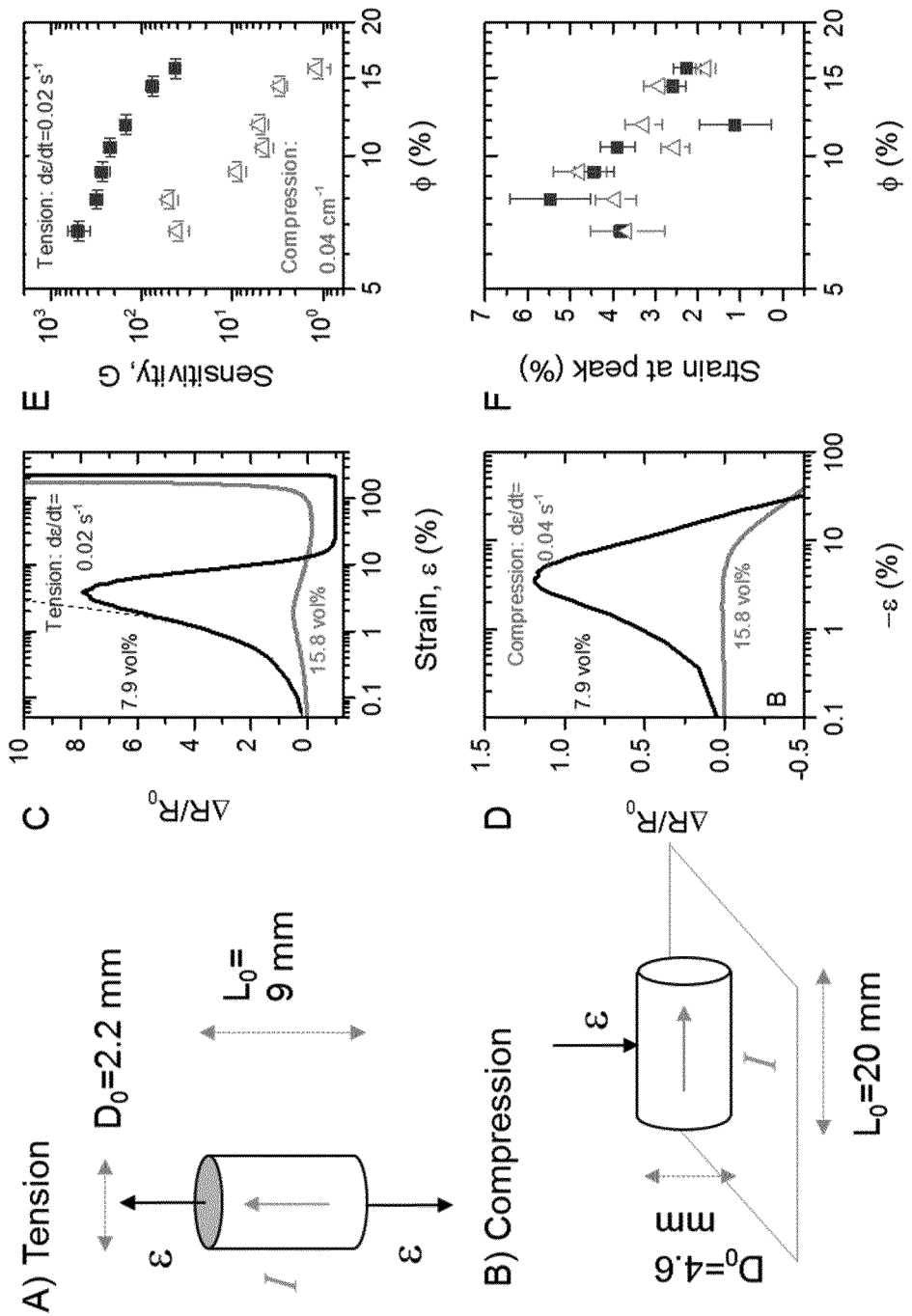
FIG. 5: Electromechanical properties of G-putty. A-B) Schematics showing relative directions of strain and current flow as well as sample dimensions for tensile and compressive measurements respectively. C-D) Fractional resistance change for G-putty of two different volume fractions as a function of C) tensile strain (strain rate=0.02 s−1) and D) compressive strain (strain rate=0.04 s−1). The dashed line in C represents a gauge factor of G=350. E-F) Gauge factor (E) and strain associated with peak in ΔR/R0 (F) plotted versus volume fraction.

Electromechanical Properties of G-Putty Having Non-Covalent, Transient Crosslinks The data in FIG. 4B show a change in the electrical properties of the G-putty on deformation. This was explored in more detail by measuring the resistance of the G-putty while deforming it both in tension and compression as shown in FIG. 5A-B. The fractional resistance change, $\Delta R/R_0$, is shown in FIG. 5C-D as a function of applied strain, $\varepsilon$, for two graphene loading levels. For all composites studied and all strain rates employed, these curves displayed a linear increase at low strain, followed by a substantial decrease at strains above a few percent. At high strain, the resistance generally falls below the initial value, while for the tensile curves, $\Delta R/R_0$ increases sharply at very high strain as the material fails. This is in stark contrast to the commonly observed behaviour for nanocomposites where $\Delta R/R_0$ increases monotonically with strain. This type of behaviour is very surprising and the Applicant believes is unprecedented in the field of electromechanical properties of nanocomposites.

The initial linear increase in $\Delta R/R_0$ with $\varepsilon$ means the G-putty can be used as a strain sensor. The sensitivity, or gauge factor, G, (defined at low strain by $\Delta R/R_0 = G\varepsilon$) is plotted versus $\phi$ for both tensile and compressive data in FIG. 5E. As $\phi \rightarrow \phi_{c,e}$ the sensitivity increases as is generally found in nanocomposite sensors, reaching G=50 and 500 for the compressive and tensile measurements respectively (FIG. 5E). These values are extremely large (metal strain gauges have G-2) and surpass most nanocomposite strain sensors which usually have G<30. The linearity persists up to strains of 2-6%, depending on $\phi$ (FIG. 5F). This is in line with metal strain gauges, making these G-putty a viable option for most low-strain sensing applications.

All nanocomposites have a standard reaction to deformation: as the strain increases, so does the resistance. The behaviour described above, an increase in resistance at low strain, followed by a decrease at higher strain is unprecedented. It is worth considering the reasons, although one should not be bound by the theory put forward. At low strain, the resistance increases because the network of graphene sheets is deformed. This both breaks connections between sheets and increases the distance between sheets. Both effects increase the resistance. However, as shown in FIG. 4, the graphene sheets are mobile and can both move and rotate over time. This allows them to move slowly through the putty reforming the previously broken connections. This results in a decrease in resistance at long times (high strains), explaining the data observed here.

Figure 6A:
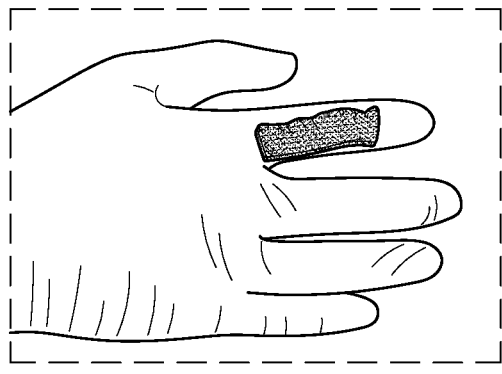
FIG. 6: Applications of G-putty (φ=6.8 vol %). B-E) Resistance waveforms measured while using G-putty to sense finger wagging (B) both normal (C) and deep (D) breathing as well as pulse (E). In D) the first and second components of the double peaks are associated with inhaling and exhaling respectively (3 cm×1 cm strip). In E) the inset shows a magnified version of a single period of the waveform. F) Fractional resistance change associated with the response of flat square strips (3 cm×3 cm) of G-putty to being impacted by falling metal balls. The annotation gives the ball mass and height from which it was dropped. Inset: ΔR/R0 plotted vs. time after impact on log scale. G) Peak ΔR/R0 plotted versus approximate energy deposited by the falling ball (calculated from Emgh=mgh). Two data sets are displayed, one where the ball mass was kept constant and another where the height was kept constant. H) Fractional resistance change associated with a cellar spider (*Pholcus phalangioides*, see lower inset) walking across a thin circular sheet of G-putty (W=6 cm size, thickness t0=2 mm). Upper inset: magnified response showing individual footsteps.
Figure 6B:
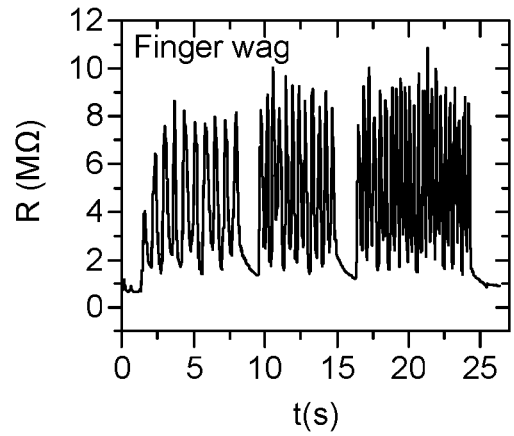
Figure 6C:
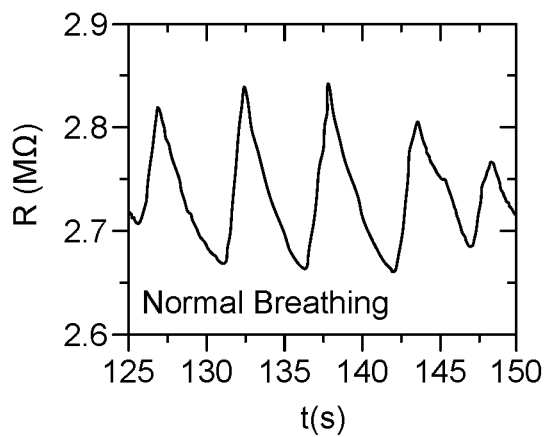
Figure 6D:
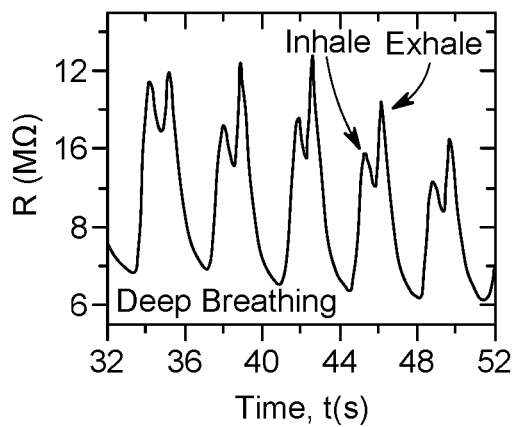
Figure 6:
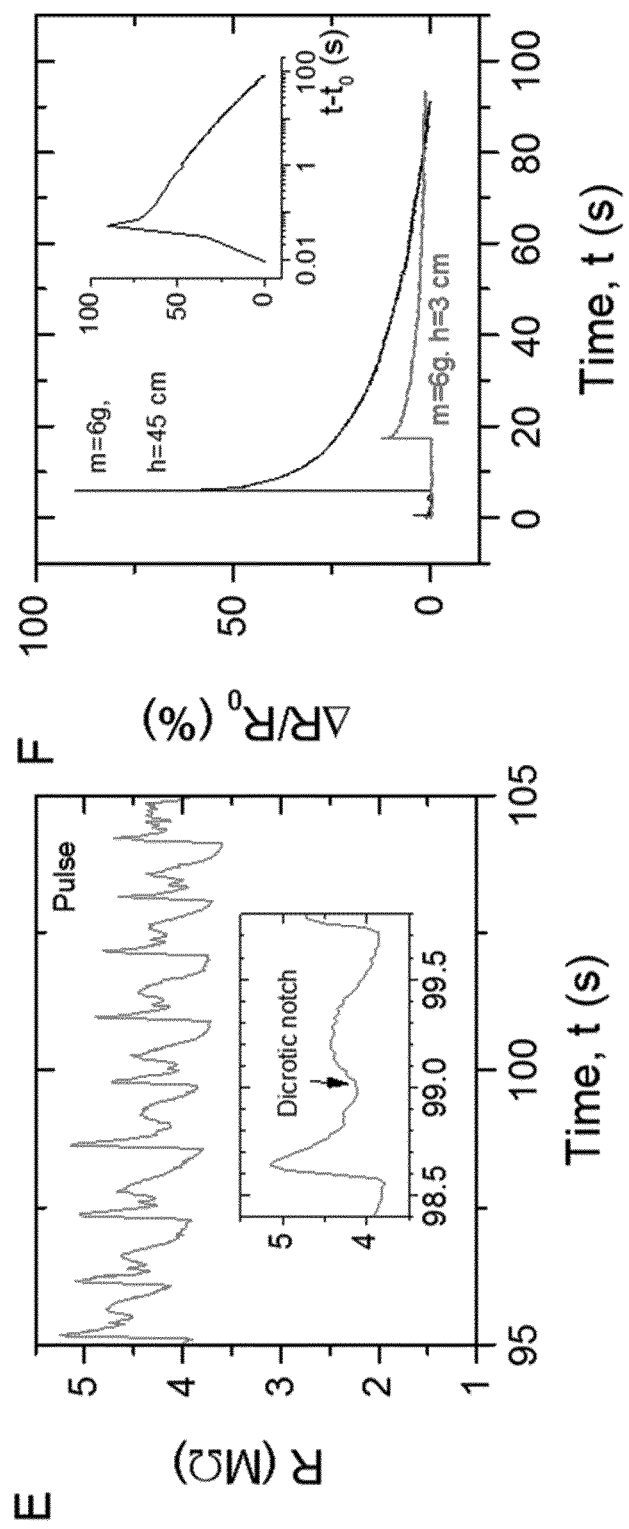
Figure 6:
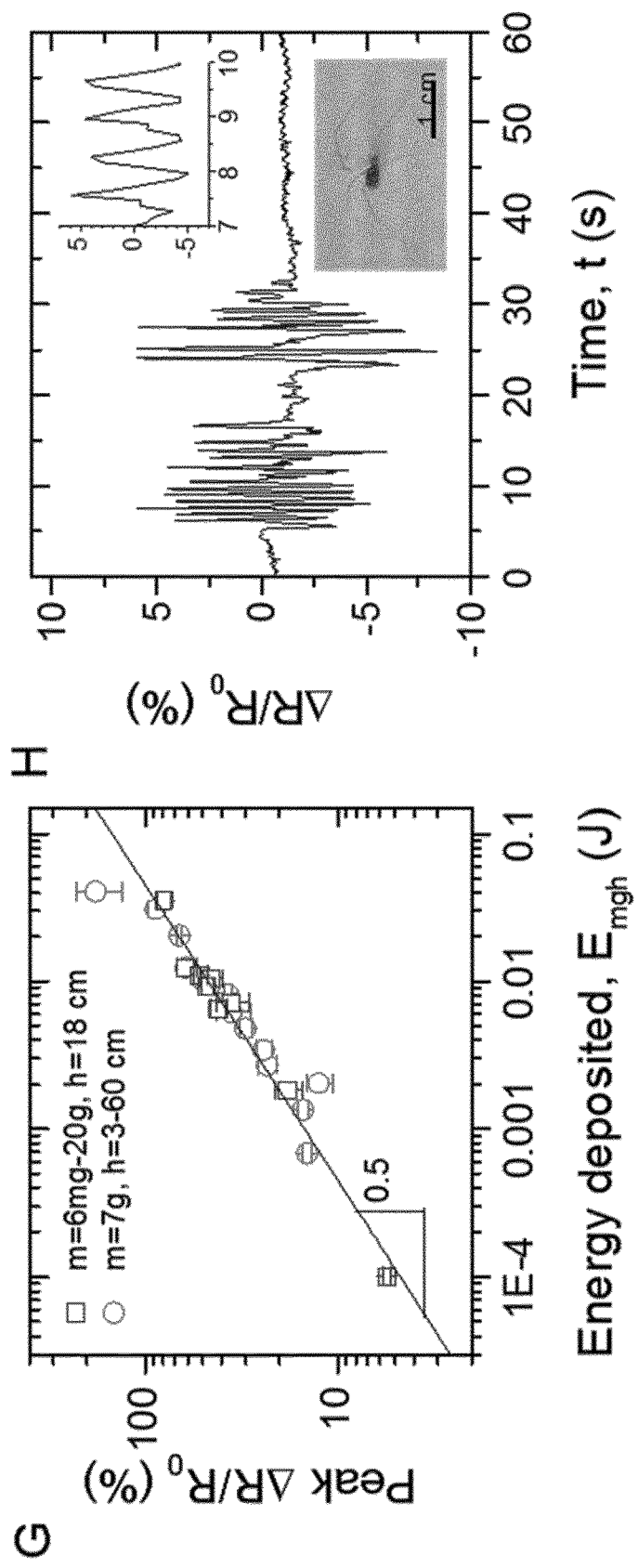

G-Putty Having Non-Covalent, Transient Crosslinks as a High-Performance Mechanical Sensor G-putty can be demonstrated to act as a high performance electromechanical sensing material. By mounting a strip of G-putty across a finger joint (FIG. 6A), it is straightforward to measure rapid bending movements by monitoring the G-putty resistance versus time. When mounted on the chest cavity, the G-putty can monitor respiration with the structure of the resistance waveform clearly changing with the type of breathing (FIG. 6C-D). When mounted on the carotid artery, the G-putty acts as a pressure sensor outputting a waveform allowing pulse monitoring (FIG. 6E). The unprecedented sensitivity of G-putty can be seen via the structure of the pulse waveform where the characteristic double peak and dicrotic notch can easily be seen.

The G-putty was also tested as an impact sensor by dropping balls of different mass, m, into a thin putty sheet from different heights, h. The resultant resistance waveforms show a rapid jump on impact followed by a power law decay (FIG. 6F). Interestingly the peak change in $\Delta R/R_0$ varied as the square root of impact energy ($E_{mgh}$=mgh). The small impact energies probed in FIG. 6G suggest G-putty can be a very sensitive impact sensor. To test this, a small cellar spider (mass-20 mg, FIG. 6H inset) was induced to walk over a plastic wrap (Clingfilm)-coated G-putty sensor. The resultant resistance plot is shown in FIG. 6H and clearly shows individual spider footsteps, demonstrating the high sensitivity of this material.

Figure 7A:
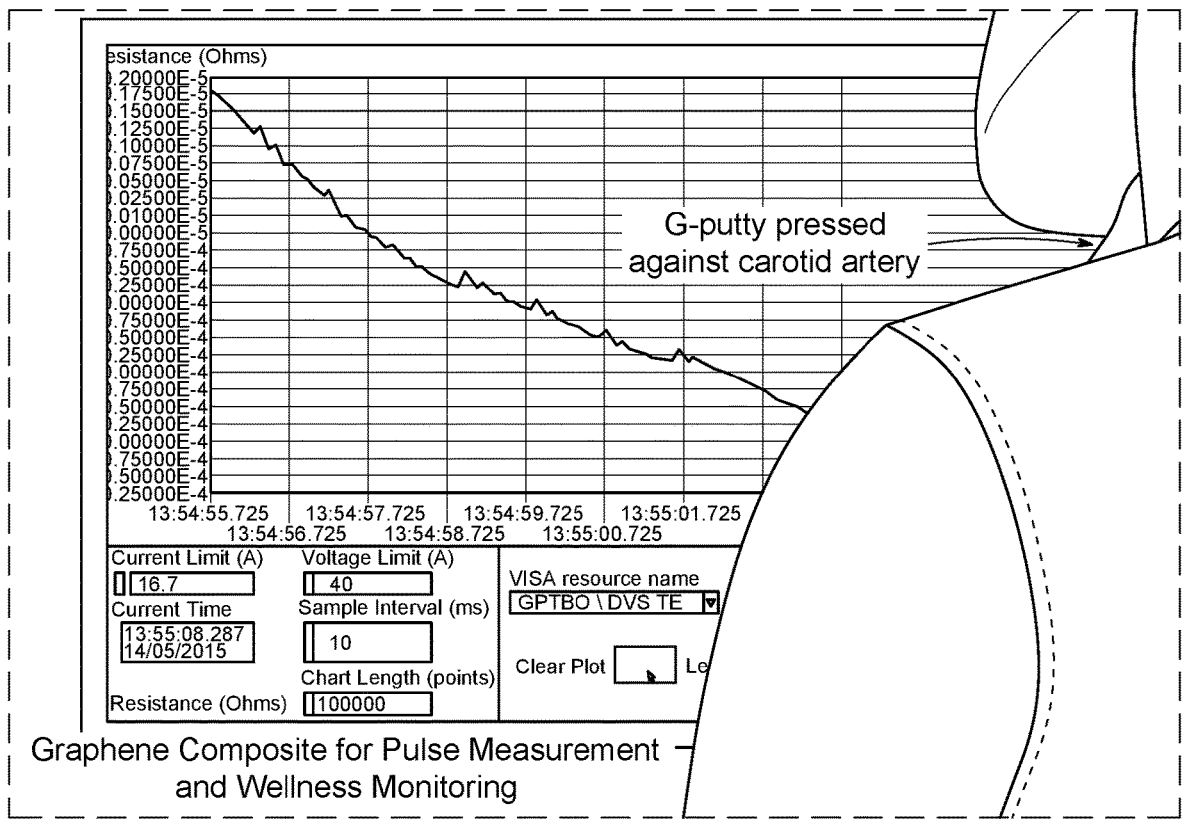
FIG. 7: (A) Photo of subject during pulse/blood pressure measurement. (B) Schematic showing details of the calibration experiment. The red rectangle represents the tensile tester and the red circle represents a wire of diameter 6.5 mm diameter which was attached to the tester to simulate the carotid artery. (C) Calibration data for a 6.8 vol % G-putty arranged as a patch 2 mm thick and 2×2 cm in lateral dimensions. The left, middle and right columns represent each of three separate calibration tests, involving low, medium and high pressures respectively. The top row shows the applied pressure versus time with the middle row showing a zoom in of an arbitrary time range. The arrows in the top row show the pressure associated with 40 mm Hg. The bottom rows show the resultant resistance trace with the insets showing a zoomed in section of an arbitrary time range. (D) Left: Difference between max and min pressure for a given cycle, plotted versus cycle number. Middle: Fractional difference between max and min resistance for a given cycle, plotted versus cycle number. Right: Mean of the resistance date (middle) plotted versus mean of pressure data (left). The line is an empirical fit. (E) Resistance vs time trace for blood pressure measurement (inset: zoom showing period of the waveform and illustrating the position of the dichroic notch). Here the G-putty was held as static as possible during the measurement.

Because G-putty is a sensitive strain and deformation sensor, the possibility of measuring blood pressure using G-putty was tested. The measurement is the same as the pulse measurement in FIG. 6E: the G-putty with attached electrodes is held against the carotid artery in the neck and the resistance measured as a function of time (FIG. 7A). Here, measurement of pulse (heart rate) is simple as it's just a measure of the period of the waveform. Measurement of blood pressure is less simple as it requires a calibration to transform the magnitude of the resistance into blood pressure. In addition, the data in FIG. 7A shows the pulse measurement to sit on top of a non-static baseline which decays over time. This resistance decay is due to the relaxation of the nanosheet network after the initial pressure of pressing the G-putty against the neck and is intrinsic to the viscoelastic nature of the G-putty. Because of this varying baseline, it is very challenging to measure the absolute pressure associated with the resistance waveform. However, it should be possible to develop a calibration to measure the pressure difference associated with the amplitude of the pulse waveform. This pressure difference is equal to the systolic minus the diastolic pressure and is known as the pulse pressure.

Figure 7B:
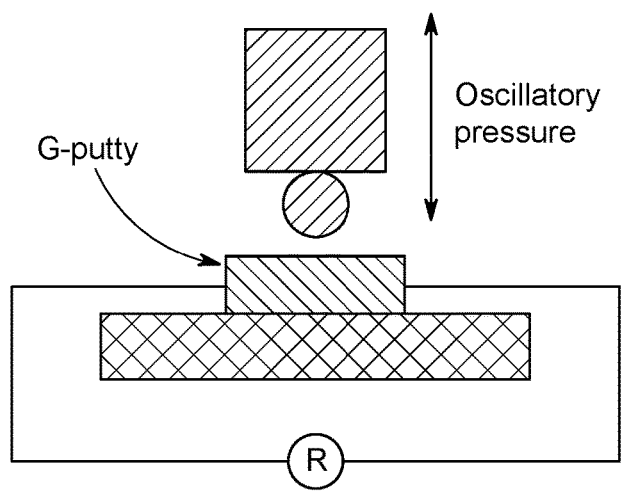
Figure 7:
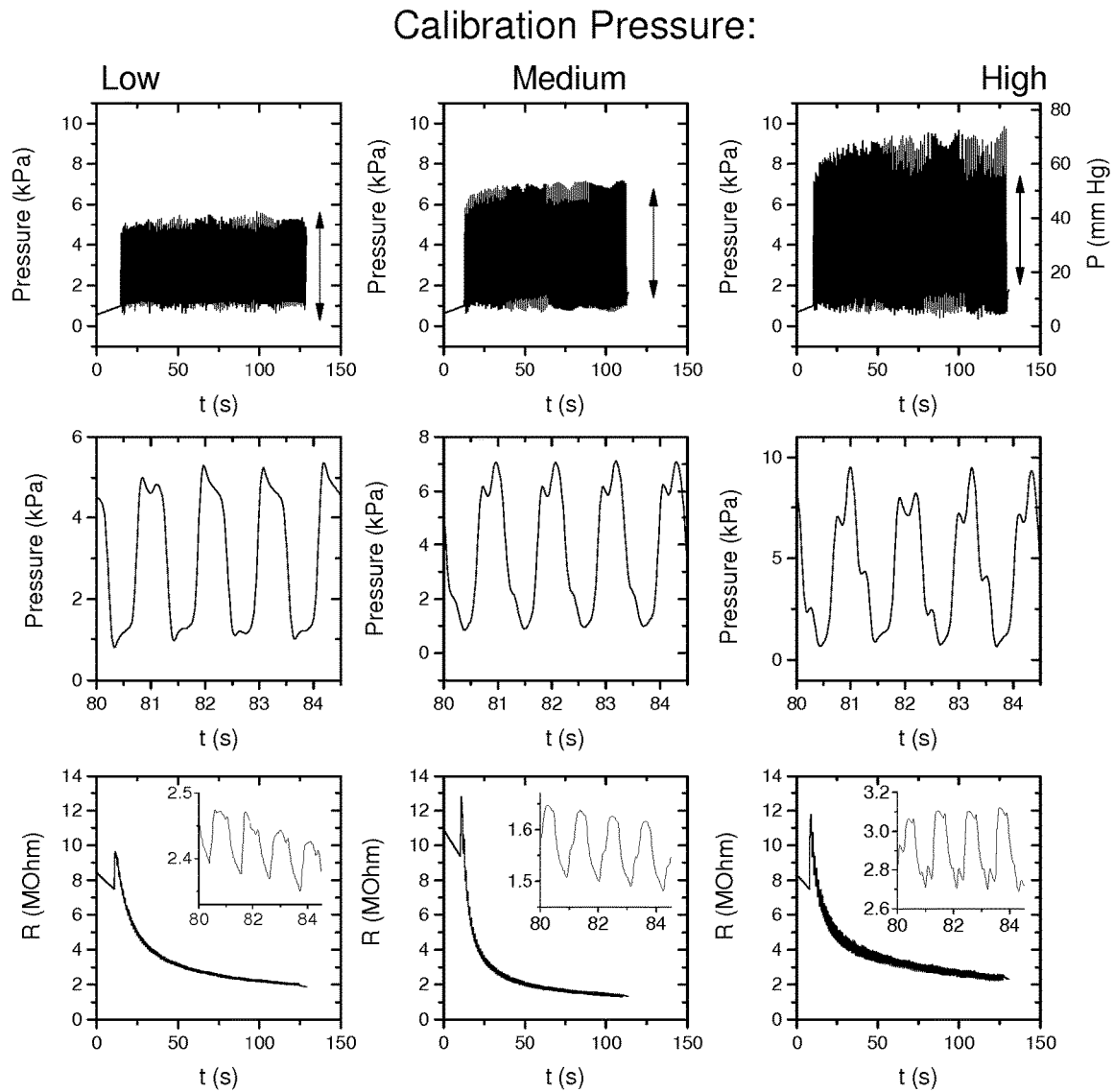
Figure 7:
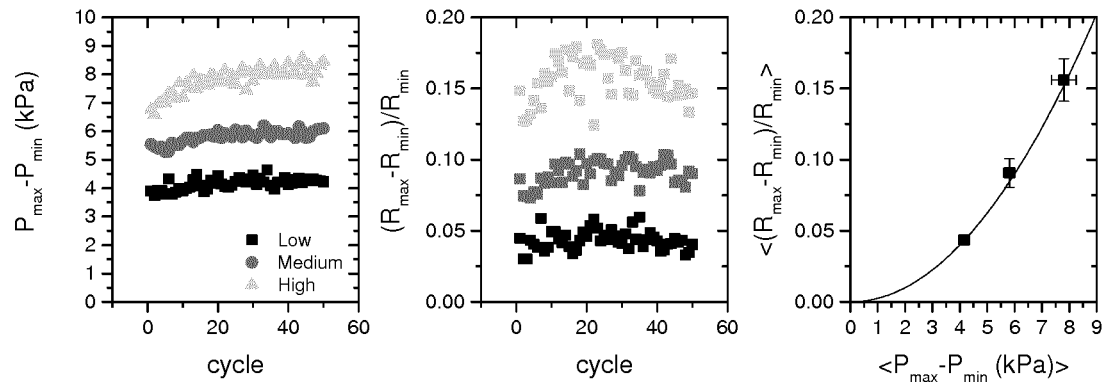
Figure 7:
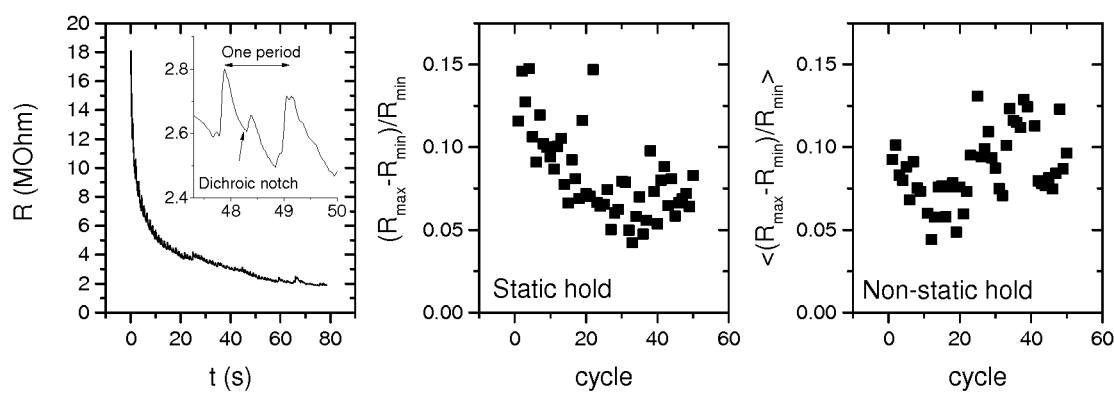

In order to develop such a calibration, the tensile tester used to generate electromechanical data was modified to crudely simulate the pulsation of the carotid artery. To do this a wire of diameter 6.5 mm (typical width of the carotid artery at the neck) was attached to the end of the tensile tester (FIG. 7B). The tensile tester was then set to oscillate the wire so it exerts a cyclic pressure on the G-putty. The maximum and minimum pressure could be controlled as could the frequency. The frequency was set to 0.9 Hz, to mimic a typical healthy adult. The difference between maximum and minimum pressure was controlled to be close to 5.3 kPa (40 mm Hg), again close to that expected for a healthy adult. The wire was oscillated for 50 cycles measuring both pressure and G-putty resistance as a function of time. This was repeated for three different pressure differences; 4.2, 5.8 and 7.8 kPa (31.5, 43.5 and 58.5 mm Hg), deemed low, medium and high. The resultant data is shown in FIG. 7C.

From the data in FIG. 7C, the pressure difference associated with each cycle was extracted and plotted in FIG. 7D (left). It should be noted that although these data should be constant for a given experiment, there is some scatter due to imperfections in the feedback system used to control the pressure. The fraction resistance change over each cycle, $(R_{max}-R_{min})/R_{min}$, was extracted and plotted versus cycle number in FIG. 7D (middle). These resistance changes are relatively stable with cycle number and clearly scale with pressure. After averaging over the 50 cycles, the mean value of $(R_{max}-R_{min})/R_{min}$ versus the mean $(P_{max}-P_{min})$ was plotted, as shown in FIG. 7D (right). A very clear scaling was found which has been fitted empirically to $(R_{max}-R_{min})/R_{min}=0.0025 (P_{max}-P_{min})^2$, where the pressure is in kPa. This relationship is useful as it can be inverted and used to find the pressure difference associated with an oscillatory resistance (so long as the putty used has the same properties as that used for calibration and the geometry of the putty and measurement is the same). Then, one can rearrange to find the pressure difference in mm Hg, which is given by:

$$(P_{max}-P_{min})=150\times\sqrt{(R_{max}-R_{min})/R_{min}} \quad (3)$$

This calibration relation can be used to find the actual blood pressure from a pulse waveform (so long as the putty used has the same properties as that used for calibration and the geometry of the putty and measurement is the same).

Shown in FIG. 7E (left) is actual data for a pulse measurement similar to that in FIG. 7A. There is a sharp decay over the first 10 s after which the baseline stabilises. Superimposed on the baseline is a ripple which is the pulse measurement. This can be more clearly seen in the inset. The pulse waveform was measured in two ways. First the G-putty was held to the carotid artery in the neck with a static force (as much as possible). Secondly, the G-putty was held to the neck with a non-static force, where the fingers holding the G-putty were moved randomly over the course of the measurement. The second measurement was to explore the robustness of the measurement. For each pulse waveform, $(R_{max}-R_{min})/R_{min}$ was measured for each cycle and plotted versus cycle number in FIG. 7E (middle and right). In both panels the $(R_{max}-R_{min})/R_{min}$ decays over the first 10-20 cycles. The mean values of $(R_{max}-R_{min})/R_{min}$, measured after the $20^{th}$ cycle were 0.7±0.2 and 0.95±0.2 (the error is the standard deviation). Using the equation above, these translate into pulse pressures of 40±6 mm Hg and 46±6 mm for the static and non-static measurement. Although these measurements are equal within error, the static value is much more as expected for a healthy adult. This clearly shows that if the G-putty is held static with respect to the neck, it is possible to measure the subject's blood pressure (as well as pulse). This also implies that efforts must be made to keep the applied force constant and that measurements should be taken over more than 50 cycles to reduce the standard deviation.

Viscosity and Sensitivity of Non-Covalent Polymer Matrix

Figure 9A:
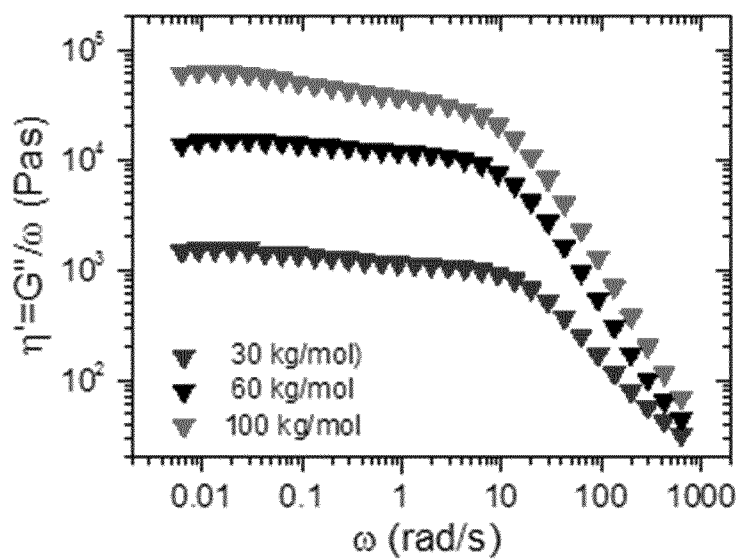
FIGS. 9A and 9B.
Figure 9B:
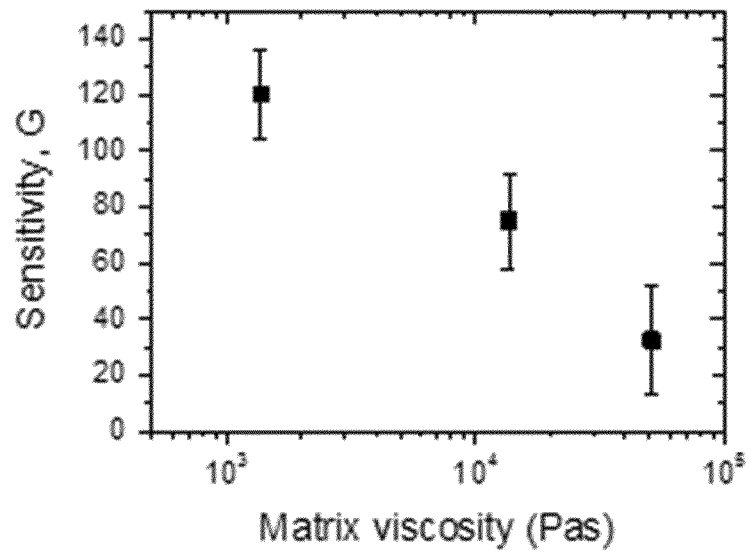

As can be seen in FIG. 9B, the sensitivity of the G-putty was plotted versus the viscosity of the putty matrix (before a conductive nanomaterial was added). The matrix viscosity was extracted from the flat, low-frequency portion of dynamic viscosity vs frequency plots of FIG. 9A. The different viscosities of the three points shown is the result of using silicone oil of three different molecular weights (see the figure legend for FIG. 9A). Each of the oils was non-covalently cross-linked with boric acid in an identical way. This gave three different composite materials with different matrix viscosities. To each was added graphene in an identical manner and the sensitivity was measured. From this, it is clear that lower matrix viscosity leads to better sensitivity. The oil itself has viscosity about 0.3 Pa s. The preferred range of viscosity for the material of the invention is no higher than about 11,000 Pa s and no lower than about 50 or 100 Pa s.

Figure 8:
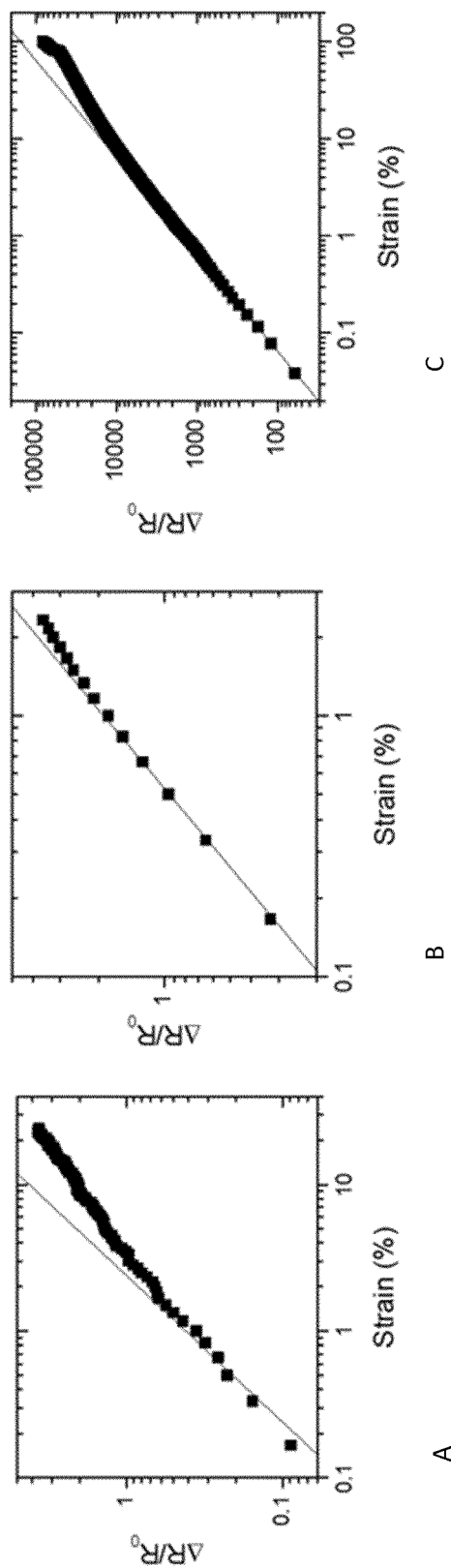
FIG. 8A-C illustrates the sensitivity of a composite material of the invention having transient or non-covalent crosslinking (FIG. 8B,C) versus a composite material having covalent or permanent crosslinking (FIG. 8A). The graphs are presented as sensitivity versus strain (%). The high viscosity of the composite material of FIG. 8A produces a material (in this instance, covalently crosslinked G-putty with graphene) with a sensitivity rating of G=42. The low viscosity of the composite material of FIG. 8B produces a material (in this instance, transient non-covalent crosslinked G-putty with graphene) with a sensitivity rating of G=190. The sensitivity of the low viscosity composite material of FIG. 8C (a transient cross-linked hydrogel with silver nano-platelets) is G=155,000. The use of the transient or temporary non-covalent bonded crosslinked composite material resulted in a 4.52-fold and a 3,690-fold increase in sensitivity, respectively, versus the covalently bonded crosslinked composite material.

FIG. 8 shows the sensitivity range of non-covalent cross-linked composite material described herein (FIGS. 8B and 8C) compared against a composite material having covalent cross-linking (FIG. 8A). The sensitivity of the covalent cross-linked composite material (PDMS) with graphene is G=42. The sensitivity of the non-covalent cross-linked composite material (PDMS) with graphene is G=190, while that of the non-covalent cross-linked composite material (hydrogel) with silver nano-platelets is G=155,000. The presence of the non-covalent cross-linking material results in a significant increase in the sensitivity of the material.

In summary, the Applicants have found that adding a conductive nanomaterial, such as nanosheets of graphene or silver nano-platelets, to a highly viscoelastic polymer having non-covalent, transient crosslinks, increases the electrical and mechanical properties dramatically. The electromechanical properties are linked to disruption of the nanosheet network. However, due to the low polymer viscosity, the nanosheets are mobile, with relaxation leading to self-healing after deformation. The nanosheet mobility and resultant time-dependent effects are prominent here because of the very low viscosity of this polymer. These phenomena lead to novel electromechanical properties with non-monotonic resistance changes as the material is strained. Even so, the composites are extremely sensitive strain and impact sensors which will find applications in a range of medical and other devices.

In the specification, the terms "comprise, comprises, comprised and comprising" or any variation thereof and the terms "include, includes, included and including" or any variation thereof are considered to be totally interchangeable and they should all be afforded the widest possible interpretation and vice versa.

The invention is not limited to the embodiments hereinbefore described but may be varied in both construction and detail.

The invention claimed is:

1. A composite material consisting of a cross-linked viscoelastic material and a conductive nanomaterial, characterised in that the cross-linked viscoelastic material is a low-viscosity, weakly cross-linked short-chain polymer or a low-viscosity, weakly cross-linked hydrogel and the conductive nanomaterial is embedded and partially mobile within the viscoelastic material.

2. The composite material according to claim 1, wherein any deformation of the composite material results in a large fractional change in its electrical resistance.

3. The composite material according to claim 1, wherein the low-viscosity, weakly cross-linked short-chain polymer or the low-viscosity, weakly cross-linked hydrogel is a non-Newtonian material that is fluid-like under ambient conditions prior to the addition of the conductive nanomaterial.

4. The composite material according to claim 1, wherein the composite material is solid-like when the conductive nanomaterial is embedded therein.

5. The composite material according to claim 1, wherein the low-viscosity, weakly cross-linked short-chain polymer is selected from an elastomer, a thermoplastic, an adhesive, a copolymer, a biopolymer, or a mixture thereof.

6. The composite material according to claim 1, wherein the cross-linked viscoelastic material is crosslinked with a reagent that forms weakly cross-linked hydrophobic materials.

7. The composite material according to claim 1, wherein the cross-linked viscoelastic material is cross-linked with Boric Acid that forms weakly cross-linked hydrophobic materials.

8. The composite material according to claim 1, wherein the low-viscosity, weakly cross-linked hydrogel is weakly crosslinked with any reagent that forms weakly crosslinked hydrophilic viscoelastic materials.

9. The composite material according to claim 1, wherein a concentration of the conductive nanomaterial in the composite material is between about 0.5 vol. % to about 20 vol. %.

10. The composite material according to claim 1, wherein the conductive nanomaterial is selected from graphene, metallic nano-particles, metallic nano-platelets, metallic nanowires, carbon fibres, carbon black, carbon nanotubes, and long multi-walled carbon nanotubes.

11. The composite material according to claim 1, in which a viscosity of the weakly cross-linked short chain polymer or low-viscosity, weakly cross-linked hydrogel is between about 50 Pa s and 11,000 Pa s.

12. The composite material according to claim 1, in which the composite material has a gauge factor of greater than about 50.

13. A sensing device comprising a composite material, the composite material consists of a cross-linked viscoelastic material and a conductive nanomaterial, characterised in that the cross-linked viscoelastic material is either a low: viscosity, weakly cross-linked hydrogel or a low: viscosity, weakly cross-linked short-chain polymer, and the conductive nanomaterial is embedded and partially mobile within the viscoelastic material.

14. The device according to claim 13, wherein any deformation of the composite material results in a large fractional change in its electrical resistance.

15. The device according to claim 13 wherein the composite material is solid-like.

16. The device according to claim 13, wherein the low-viscosity, weakly cross-linked short-chain polymer is selected from an elastomer, a thermoplastic, an adhesive, a copolymer or a biopolymer.

17. The device according to claim 13, wherein the low-viscosity, weakly cross-linked short-chain polymer is a low-molecular weight short-chain polymer.

18. The device according to claim 13, wherein the low-viscosity, weakly cross-linked short-chain polymer is cross-linked with a reagent that forms weakly cross-linked hydrophobic viscoelastic materials.

19. The device according to claim 13, wherein the low-viscosity, weakly cross-linked short-chain polymer is cross-linked with boric acid that forms weakly cross-linked hydrophobic viscoelastic materials.

20. The device according to claim 13, wherein the low-viscosity, weakly cross-linked hydrogel is cross-linked with a reagent that forms a weakly cross-linked hydrophilic hydrogel.

21. The device according to claim 13, wherein the concentration of the conductive nanomaterial in the composite material is between about 0.5 vol. % to about 20 vol. %.

22. The device according to claim 13, in which the device is configured to measure joint movement, heart function, respiratory response, impact sensing, blood pressure, pulse, motion, position, velocity acceleration, or vibration.

23. The device according to claim 13, wherein the conductive nanomaterial is selected from graphene, metallic nano-particles, metallic nano-platelets, metallic nanowires, carbon fibres, carbon black, carbon nanotubes, and long multi-walled carbon nanotubes.

24. The device according to claim 13, in which the viscosity of the low-viscosity, weakly cross-linked short chain polymer or the low-viscosity, weakly cross-linked hydrogel is between about 50 Pa s and 11,000 Pa s.

25. The device according to claim 13, in which the composite material has a gauge factor of greater than about 50.

* * * * *